United States Patent
Hori et al.

(10) Patent No.: US 9,153,365 B2
(45) Date of Patent: Oct. 6, 2015

(54) TEMPERATURE SENSOR ELEMENT, METHOD FOR MANUFACTURING SAME, AND TEMPERATURE SENSOR

(75) Inventors: Tsunenobu Hori, Kariya (JP); Kaoru Kuzuoka, Toyota (JP); Chiaki Ogawa, Tajimi (JP); Motoki Satou, Okazaki (JP); Katsunori Yamada, Nagoya (JP); Takao Kobayashi, Seto (JP); Kazuhiro Inoguchi, Toyota (JP)

(73) Assignees: DENSO CORPORATION, Kariya (JP); KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

(21) Appl. No.: 13/639,327

(22) PCT Filed: Apr. 27, 2011

(86) PCT No.: PCT/JP2011/060310
§ 371 (c)(1),
(2), (4) Date: Oct. 4, 2012

(87) PCT Pub. No.: WO2011/136294
PCT Pub. Date: Nov. 3, 2011

(65) Prior Publication Data
US 2013/0020670 A1  Jan. 24, 2013

(30) Foreign Application Priority Data

Apr. 28, 2010 (JP) ................. 2010-104413
Apr. 6, 2011 (JP) ................. 2011-084154

(51) Int. Cl.
*H01L 35/14* (2006.01)
*H01C 7/00* (2006.01)
(Continued)

(52) U.S. Cl.
CPC ........ *H01C 7/008* (2013.01); *G01K 7/22* (2013.01); *H01C 7/021* (2013.01)

(58) Field of Classification Search
USPC .......................................... 257/467
See application file for complete search history.

(56) References Cited

U.S. PATENT DOCUMENTS 6,245,439 B1   6/2001  Yamada et al.
7,012,502 B2 *  3/2006  Shibayama ................. 338/28
(Continued)

FOREIGN PATENT DOCUMENTS

JP   60-180968   9/1985
JP   62-171979   7/1987
(Continued)

OTHER PUBLICATIONS

Office Action (8 pgs.) dated Dec. 2, 2013 issued in corresponding Chinese Application No. 201180021071.4 with an at least partial English-language translation thereof (9 pgs.).
(Continued)

*Primary Examiner* — Roy Potter
*Assistant Examiner* — Damian A Hillman
(74) *Attorney, Agent, or Firm* — Nixon & Vanderhye P.C.

(57) ABSTRACT

A temperature sensing element includes a thermistor composed of Si-base ceramics and a pair of metal electrodes bonded onto the surfaces of the thermistor. The metal electrodes contain Cr and a metal element α having a Si diffusion coefficient higher than that of Cr. A diffusion layer is formed in a bonding interface between the thermistor and each metal electrode, the diffusion layer including a silicide of the metal element α in a crystal grain boundary of the Si-base ceramics. A temperature sensor including the diffusion layers is provided. Owing to the diffusion layers, the temperature sensor ensures heat resistance and bonding reliability and enables temperature detection with high accuracy in a temperature range, in particular, of from −50° C. to 1050° C.

14 Claims, 13 Drawing Sheets

(51) Int. Cl.
*G01K 7/22* (2006.01)
*H01C 7/02* (2006.01)

(56) References Cited

U.S. PATENT DOCUMENTS

| | | | |
|---|---|---|---|
| 7,748,898 B2* | 7/2010 | Toudou et al. | 374/208 |
| 2005/0271891 A1 | 12/2005 | Kuzuoka et al. | |
| 2008/0205484 A1 | 8/2008 | Toudou et al. | |

FOREIGN PATENT DOCUMENTS

| | | |
|---|---|---|
| JP | 6-279122 | 10/1994 |
| JP | 3007281 | 11/1999 |
| JP | 2005-343768 | 12/2005 |
| JP | 2007-022893 | 2/2007 |
| JP | 2009-007206 | 1/2009 |
| JP | 2009007206 A * | 1/2009 |
| JP | 2009007206 A * | 1/2009 |
| JP | 2009-288023 | 12/2009 |

OTHER PUBLICATIONS

International Search Report for PCT/JP2011/060310, mailed Jul. 19, 2011.
Edited by UCS Handotai Kiban Gijutsu Kenkyukai, Silicon no Kagaku, 1$^{st}$ print, Kabushiki Kaisha Riaraizu Sha, (Jun. 28, 1996), pp. 1015-1016.
International Preliminary Report on Patentability dated Dec. 20, 2012, issued in counterpart Japanese Application No. PCT/JP2011/060310 with English translation.

* cited by examiner

FIG. 7
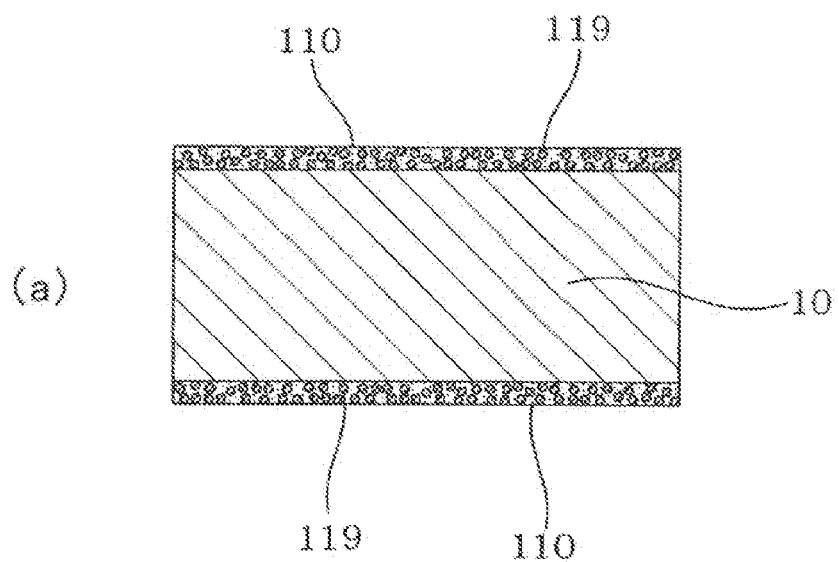
(a)
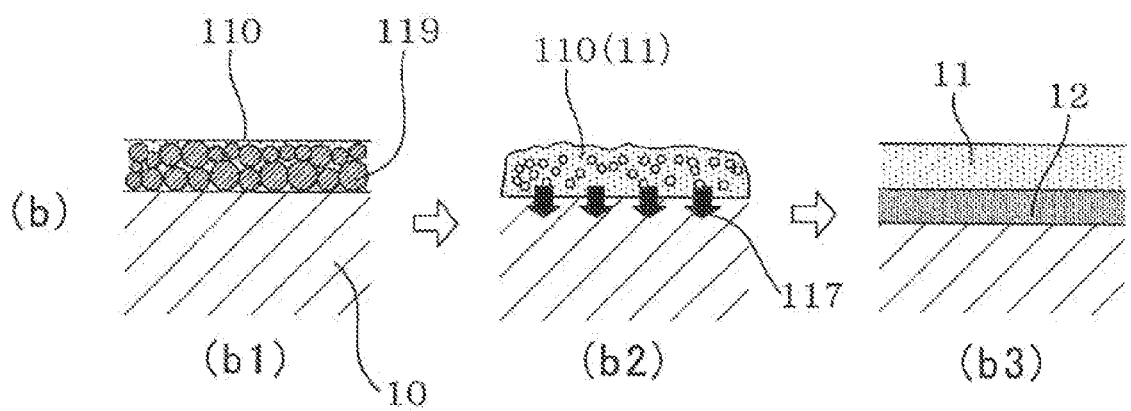
(b)

FIG.10
(a)
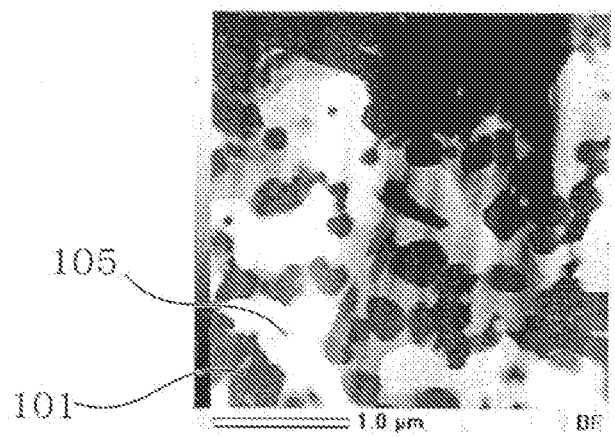
(b)
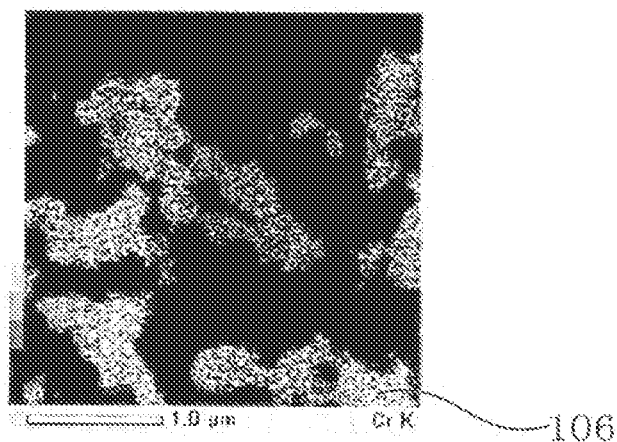
(c)
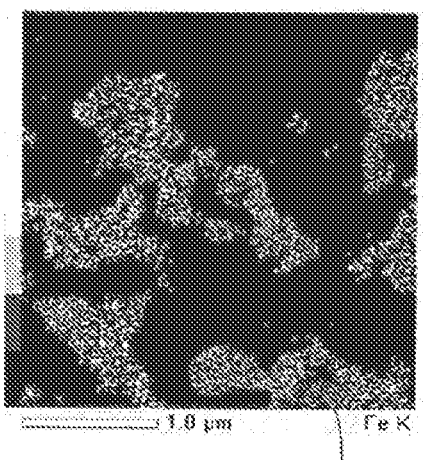

FIG.15
(a) 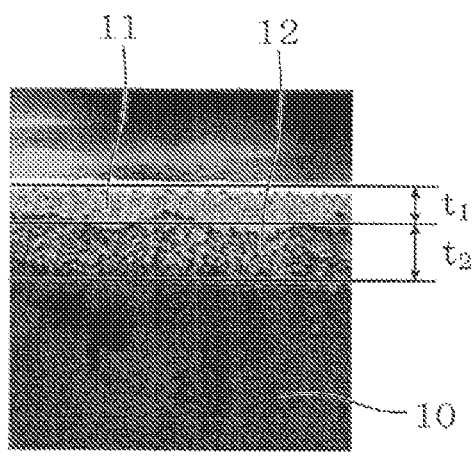
(b) Si 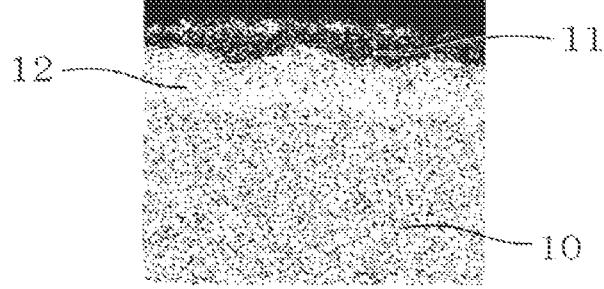
(c) Cr 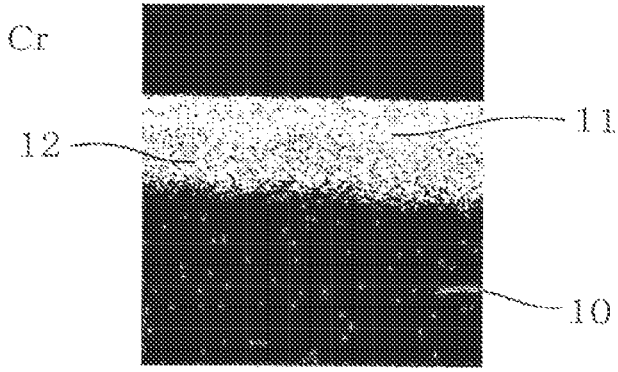
(d) Fe 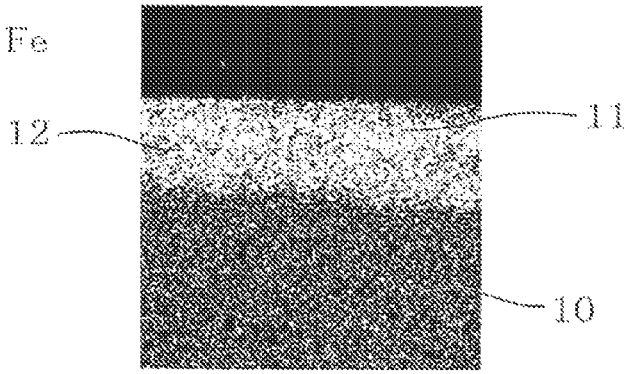

TEMPERATURE SENSOR ELEMENT, METHOD FOR MANUFACTURING SAME, AND TEMPERATURE SENSOR

This application is the U.S. national phase of International Application No. PCT/JP2011/060310, filed Apr. 27, 2011 which designated the U.S. and claims priority to JP Application No. 2011-084154 filed Apr. 6, 2010, and JP Application No. 2010-104413 filed Apr. 28, 2010, the entire contents of each of which are hereby incorporated by reference.

TECHNICAL FIELD

The present invention relates to a temperature sensing element used for detecting a temperature such as of an exhaust gas and a method of manufacturing the temperature sensing element, and to a temperature sensor.

BACKGROUND ART

Generally, temperature sensors are used for measuring a temperature of an exhaust gas. Such a temperature sensor may be used for detecting a temperature such as of an exhaust gas that flows through a flow path. For example, such a temperature sensor may be used being arranged in a catalytic converter of an exhaust gas purification system or an exhaust pipe of a vehicle.

An example of such a temperature sensor is shown in FIG. 9. In FIG. 9, a temperature sensor 9 includes a temperature sensing element 90 composed of a thermistor 91 having electrical characteristics that change with temperature and a pair of metal electrodes 92 formed on the surfaces of the thermistor 91, and includes a sheath pin 95 incorporating signal lines 93 which are connected, on a tip-end side, to the temperature sensing element 90 and electrically connected, on a rear-end side, to an external circuit.

In a temperature sensor having such a configuration, the signal lines 93 are bonded, such as by welding, to the respective metal electrodes 92 which are bonded to the respective surfaces of the thermistor 91. Thus, the electrical characteristics of the thermistor 91 are detected by the external circuit.

A temperature sensor used in a high-temperature oxidizing atmosphere, such as in a catalytic converter or an exhaust pipe, has problems to be solved, i.e. of ensuring bonding reliability of the temperature sensing element that is a bonded member composed of the metal electrodes and the thermistor and of ensuring heat resistance of the metal electrodes.

As a measure against these problems, a bonded member composed of ceramic and metal is suggested (see PTL 1). This bonded member includes a metal film bonded to a surface of a ceramic material and a surface layer (oxide layer) formed on a surface of the metal film. PTL 1 also suggests a bonding method that includes diffusion bonding to achieve bonding between the metal film and the ceramic. PTL 1 teaches that the bonded member obtained in this way ensures its heat resistance and bonding reliability.

On the other hand, another bonded member is suggested, which is composed of ceramic and metal electrodes bonded to the surfaces of the ceramic (see PTL 2). The metal electrodes are provided as a continuous body and have a plurality of recesses. Similar to PTL 1, PTL 2 suggests a bonding method that includes diffusion bonding. PTL 2 teaches that the bonded member obtained in this way is able to reduce thermal stress which is ascribed to the difference in linear expansion coefficient between the ceramic and the metal electrodes and thus is able to ensure bonding reliability.

Further, a ceramic sensor is suggested, which includes a ceramics plate and a metal electrode bonded to at least one surface of the ceramics plate (see PTL 3). The metal electrode has an outer periphery which is entirely or partially cut off to entirely or partially expose an end of the ceramics plate. Also, at least a part of the outer periphery of the metal electrode has a thickness smaller than a center portion thereof. PTL 3 teaches that the ceramic sensor configured in this way is able to prevent the metal electrode from being separated.

Still another bonded member is suggested (see PTL 4 or 5). This bonded member is obtained by diffusing components of ceramics and metal into a bonding interface to ensure bonding reliability between the ceramics and the metal.

For example, PTL 4 suggests that, in bonding metal that contains Cr and Fe to nitride-base ceramics, the components contained in the ceramics are partially diffused into the metal to enhance bonding reliability. PTL 5 suggests that, in bonding ceramics, such as silicon nitride or silicon carbide, to metal that contains Cr and Ni, a silicide of Cr is formed in the interface between the ceramics and the metal to enhance bonding reliability.

CITATION LIST

Patent Literature

[PTL 1] JP-A-2005-343768
[PTL 2] JP-A-2007-022893
[PTL 3] JP-A-2009-007206
[PTL 4] JP-A-S60-180968
[PTL 5] JP-A-S62-171979

SUMMARY

Technical Problem

However, due to the recent trend of small-size and high-power engines, exhaust gases tend to have higher temperatures. Under such conditions, a problem has come to light. The problem is that application of a bonded member or a ceramic sensor of a conventional configuration to a temperature sensor used under high-temperature conditions lowers the degree of bonding reliability to cause separation near the bonding interface. This problem is particularly serious in a bonded member composed of ceramic and metal, the ceramic being silicon nitride, silicon carbide or the like having a low linear expansion coefficient.

Further, a bonded member or a ceramic sensor of a conventional configuration is not able to ensure ohmic contact characteristics which are important as a temperature sensor. Specifically, in order to detect a temperature with high accuracy, the resistance of a thermistor detected by an external circuit is required not to be varied. Further, the resistance value of the interface between the thermistor and each of the metal electrodes and the resistance value of the metal electrodes are required to be extremely small and the bonding areas are required to be uniform.

For example, in the technique disclosed in PTL 1, resistance of the thermistor may be varied due to the influence of the oxide layer. In the technique disclosed in PTL 2, the dimensions of the recesses may directly influence the bonding areas and thus non-uniformity of the bonding areas is unlikely to be suppressed.

The technique disclosed in PTL 4 or 5 aims at enhancing only the bonding reliability. Therefore, the technique tends to allow increase and variation in the resistance value and thus is not able to ensure ohmic contact characteristics which are important as a temperature sensor.

Specifically, in the manufacturing method disclosed in PTL 4 or 5, the bonded member is baked at a high temperature of about 1350° C. using HP or HIP to diffuse the components into the ceramics. Therefore, the resistance value of the metal becomes large and tends to be varied. When such a bonded member is applied to a temperature sensor, the temperature sensor will suffer from a problem of not being able to ensure ohmic contact characteristics which are important as a temperature sensor.

Moreover, ceramics that contains silicon nitride or silicon carbide as a matrix component generally has a crystal grain boundary area which is very small compared to a crystal area. Therefore, diffusion from the metal into the crystal grain boundary of the ceramics is extremely small, causing large variation in a diffused state.

Use of such a bonded member as a temperature sensor does not ensure ohmic contact characteristics which are likely to be influenced by an oxidized state of the metal and a diffused state of the bonding interface. In particular, when the temperature sensor is used covering a large temperature range of −50° C. to 1050° C., high measurement accuracy is not achieved due to the variation in the resistance value. In addition, since heat resistance is also deteriorated, separation and cracks are easily caused. Thus, application of such a bonded member to a temperature sensor is problematically difficult.

The present invention has been made in light of the problems set forth above to provide a temperature sensing element that ensures heat resistance and bonding reliability under high-temperature conditions, by forming a diffusion layer by positively diffusing components of a metal electrode into a crystal grain boundary of a thermistor, in a bonding interface between the thermistor and the metal electrode of the temperature sensing element, a method of manufacturing the temperature sensing element, and a temperature sensor.

Solution to Problem

A first invention provides a temperature sensing element including a thermistor having electrical characteristics that change with temperature and a pair of metal electrodes bonded onto surfaces of the thermistor, in which: the thermistor is composed of Si-base ceramics and the metal electrodes include Cr and a metal element α that has a Si diffusion coefficient higher than that of Cr; and a diffusion layer is formed in an interface between the thermistor and each of the metal electrodes, the diffusion layer including a silicide of the metal element α in a crystal grain boundary of the Si-base ceramics that composes the thermistor.

A second invention provides a method of manufacturing a temperature sensing element, including: bonding a metal electrode, which contains Cr and a metal element α having a Si diffusion coefficient higher than that of Cr, to a thermistor composed of Si-base ceramics by using a step of conducting heat treatment under a condition that a metal configured by the metal electrode is located on a surface of the thermistor; and forming a diffusion layer in which a silicide of the metal electrode α is present by diffusing the metal element α into a crystal grain boundary of the Si-base ceramics, in an interface between the thermistor and the metal electrode.

A third invention provides a temperature sensor that includes the temperature sensing element according to the first invention.

Advantageous Effects of Invention

In the temperature sensing element, the method of manufacturing the same and the temperature sensor according to the first to third inventions, the thermistor is composed of Si-base ceramics, and accordingly, ensures high heat resistance as a temperature sensor. The metal element Cr contained in each of the metal electrodes reduces the difference in linear expansion coefficient between the electrode and the thermistor. For example, in a heat treatment at a baking temperature of 1200° C., the metal element Cr is able to suppress crack generation that is caused in an interface between the electrode and the thermistor.

The metal element α contained in the metal electrodes has a Si diffusion coefficient higher than that of Cr, and therefore, produces a silicide compound much easier than Cr. The silicide of the metal element α has a linear expansion coefficient smaller than that of a Cr silicide. Also, the silicide of the metal element α has a resistance value smaller than that of the Cr silicide. Accordingly, the metal element α preferentially diffuses into the crystal grain boundary of the thermistor to form the silicide of the metal element α, thereby forming the diffusion layer of the present invention. The diffusion layer ensures heat resistance and bonding reliability under high temperature conditions. The diffusion layer also ensures ohmic contact to suppress variation in the resistance value. In particular, owing to the diffusion layer, substantially a uniform resistance value is ensured in a wide temperature range of −50° C. to 1050° C., thereby realizing a temperature sensor that enables temperature detection with high accuracy.

BRIEF DESCRIPTION OF THE DRAWINGS

FIG. 7 shows explanatory views illustrating a method of manufacturing the temperature sensing element of the present invention, specifically (a) shows an explanatory cross-sectional view of a thermistor coated with a paste of alloy powder, (b1) shows a partially enlarged view of the coating shown by (a), (b2) shows an explanatory view of a state where heat treatment causes sintering in a metal electrode and diffusion of components of the metal electrode, and (b3) shows an explanatory partial cross-sectional view around a diffusion layer in the thermistor after the heat treatment, the thermistor being formed with metal the electrode and the diffusion layer;

FIG. 10 (a) shows an ADF-STEM image indicating a diffusion layer according to an example of the temperature sensing element of the present invention, FIG. 10 (b) shows an explanatory view indicating an analysis of Cr element in the image shown by FIG. 10 (a), and FIG. 10 (c) shows an explanatory view indicating an analysis of a metal element α (Fe element) in the image shown by FIG. 10 (a);

FIG. 15 (a) shows an explanatory scanning electron micrograph indicating an interface between a metal electrode and a thermistor, FIG. 15 (b) shows an explanatory micrograph indicating an energy dispersive X-ray fluorescence analysis of Si, FIG. 15 (c) shows an explanatory micrograph indicating an energy dispersive X-ray fluorescence analysis of Cr, and FIG. 15 (d) shows an explanatory micrograph indicating an energy dispersive X-ray fluorescence analysis of Fe, according to a fourth experimental example.

DESCRIPTION OF EMBODIMENTS

With reference to FIGS. 1 to 7, hereinafter is described an exemplary embodiment according to the present invention.

Figure 1:
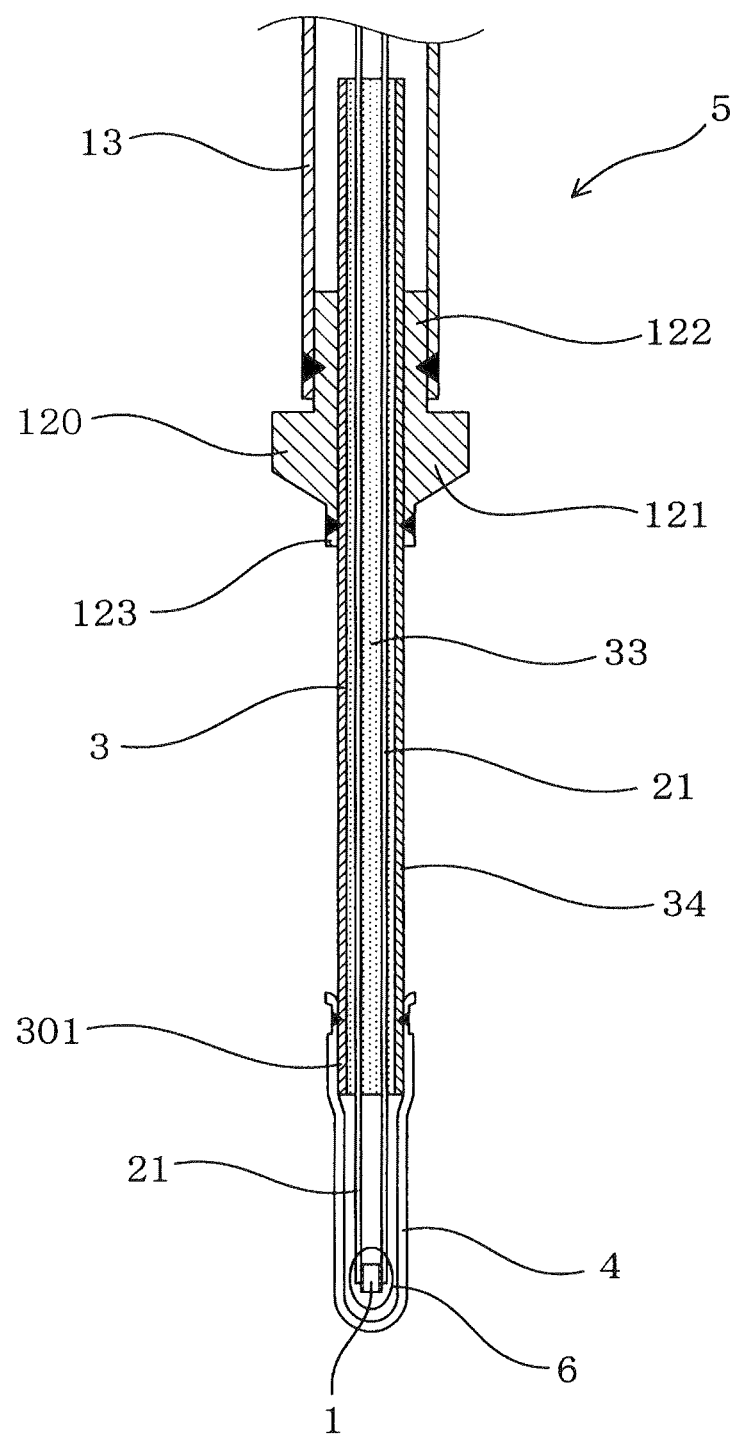
FIG. 1 is a partial front cross-sectional view illustrating a temperature sensor according to the present invention.

As shown in FIG. 1, a temperature sensor of the present example is used as a sensor for measuring the temperature of an exhaust gas of a vehicle.

A temperature sensor 5 includes a temperature sensing element 1 connected thereto on a tip-end side. The temperature sensing element 1 has a thermistor 10 whose electrical characteristics change with temperature and a pair of metal electrodes 11 provided on the surfaces of the thermistor 10. The temperature sensor 5 also includes a sheath pin 3 that accommodates a pair of signal lines 21. The pair of signal lines 21 are connected to an external circuit (not shown), on a rear-end side of the temperature sensor 5.

The temperature sensing element 1 which is provided on the tip-end side is accommodated in a cover 4. The sheath pin 3 has an outer periphery along which a rib 120 is formed so as to be located on the rear-end side with reference to the cover 4.

The rib 120 is provided with: a contact portion 121 which is in contact with a tip end surface of an inner wall of a boss for mounting the temperature sensor 5 to an internal combustion engine; a rearward extension portion 122 extending rearward from the contact portion and having an outer diameter smaller than that of the contact portion 121; and a forward extension portion 123 extending forward from the contact portion and having an outer diameter smaller than that of the contact portion 121. The sheath pin 3 is inserted and fitted into the contact portion 121, the rearward extension portion 122 and the forward extension portion 123. The rib 120 is welded to the sheath pin 3 in the forward extension portion 123 throughout the circumference thereof.

The rearward extension portion 122 has an outer periphery along which one end of a protective tube 13 is welded and fixed to protect a portion of the sheath pin 3 and the signal lines 21.

The cover 4 is welded, throughout its circumference, to an outer periphery of a tip end portion 301 of the sheath pin 3. The sheath pin 3 and the cover 4 are made of stainless steel or Ni-base heat-resistant alloy. Further, the rib 120 and the protective tube 13 are also made of stainless steel or Ni-base heat-resistant alloy.

Figure 2:
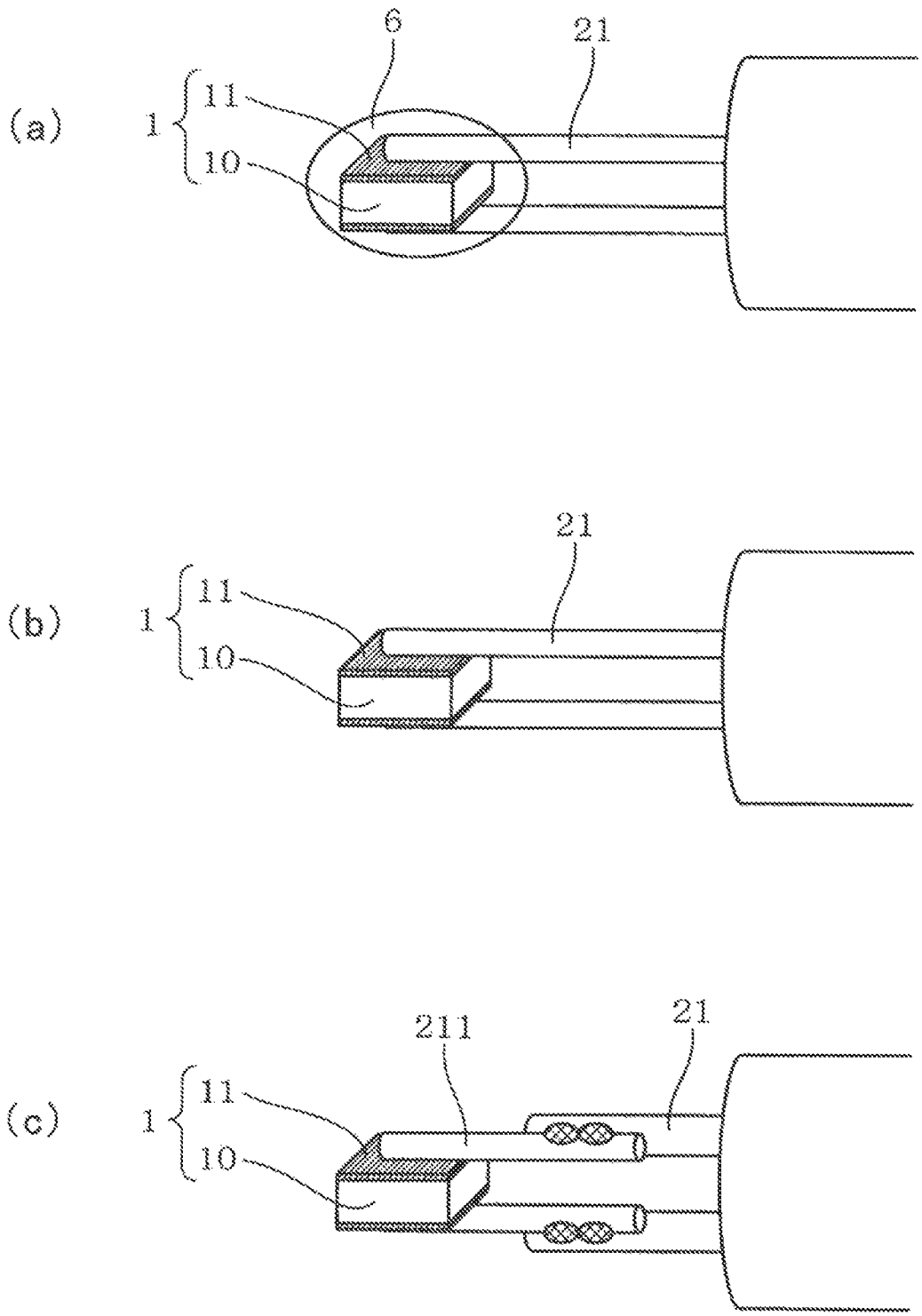
FIG. 2 (a) shows a perspective view of a tip end portion of the temperature sensor illustrated in FIG. 1, and FIGS. 2 (b) and (c) show a perspective view of another example of the tip end portion of the temperature sensor shown by FIG. 2 (a)

The sheath pin 3 is provided with: the two signal lines 21 which are made of stainless steel or Ni-base heat-resistant alloy; an insulating member 33 which is made of an insulating powder, such as magnesia, and arranged around the signal lines 21; and an outer tube member 34 which is made of stainless steel or Ni-base heat-resistant alloy and covers the outer periphery of the insulating member 33. The sheath pin 3 has a columnar shape, while the outer tube member 34 has a cylindrical shape. The signal lines 21 are exposed on the tip-end side and the rear-end side from the insulating member 33 and the outer tube member 34. FIG. 2 (a) shows a perspective view of a tip end portion of the temperature sensor 5 illustrated in FIG. 1. As shown by FIG. 2 (a), each signal line 21 has a tip end which is bonded to a corresponding metal electrode 11 of the temperature sensing element 1, and a rear end which is connected to a corresponding external signal line (not shown) which is further connected to the external circuit.

As shown by FIG. 2 (b), the temperature sensing element 1 will have no problem if it is not covered with a mold 6. However, as shown by FIG. 2 (a), a part of the temperature sensing member 1 and the signal lines 21 may preferably be sealed by the mold 6. The mold 6 is made of materials, such as an inorganic material, amorphous glass and crystallized glass. These materials have an effect of protecting the temperature sensing element 1 under a temperature of 1000° C. or more. If each of these materials by itself has a desired range of linear thermal expansion coefficient, the material may be solely used for forming the mold 6. Alternatively, amorphous glass may be mixed with crystallized glass, or glass may be added with an inorganic material powder, for example, so as to have a desired linear expansion coefficient and to be used for forming the mold 6. The inorganic material powder added to glass may include aluminum oxide ($Al_2O_3$), magnesium oxide (MgO), yttrium oxide ($Y_2O_3$), chromium oxide ($Cr_2O_3$), zirconium oxide ($ZrO_2$), or a low-thermal-expansion ceramics that configures a thermosensor 2.

As shown by FIG. 2 (c), each signal line 21 may be connected to the temperature sensing element 1 via an electrode line 211. In this case, each electrode line 211 is connected to the corresponding signal line 21 such as by laser welding. Thus, a difference in linear expansion coefficient may be further reduced between the temperature sensing element 1 and the signal line 21. Also, a configuration that can be easily manufactured may be provided.

Figure 3:
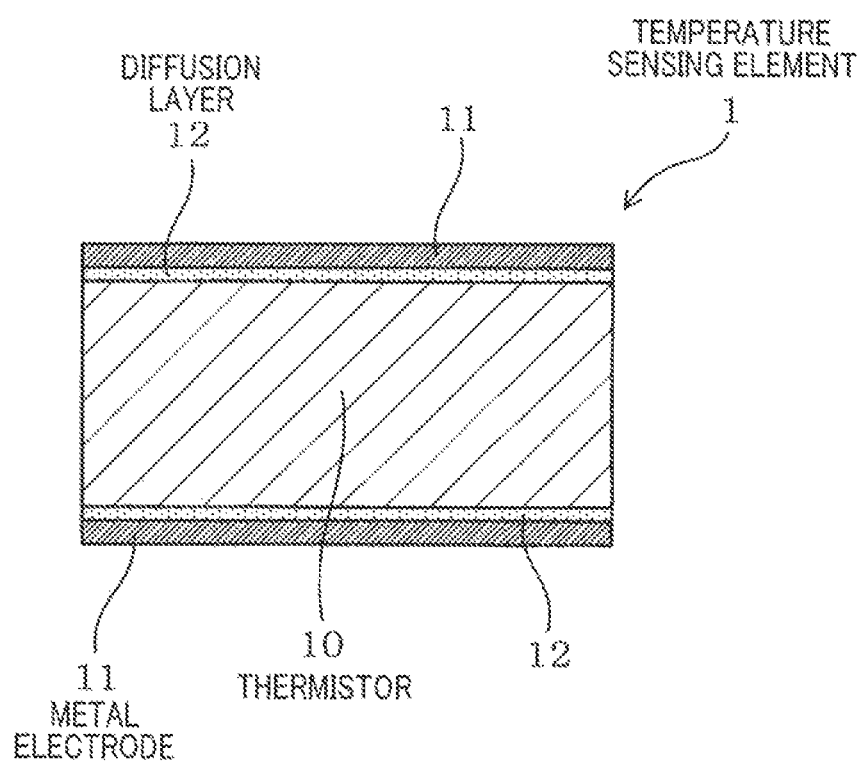
FIG. 3 is a cross-sectional view illustrating a temperature sensing element in the temperature sensor illustrated in FIG. 1.

The temperature sensing element 1 used for the temperature sensor 5 has a substantially rectangular parallelepiped shaped. As shown in FIG. 3, in the temperature sensing element 1, the pair of metal electrodes 11 are formed on the surfaces of the thermistor 10 having electrical characteristics that change with temperature. Further, a diffusion layer 12 is formed in an interface between the thermistor 10 and each metal electrode 11.

The signal lines 21 extending from inside the sheath pin 3 are directly bonded to the respective metal electrodes 11 of the temperature sensing element 1. The temperature sensing element 1 and the signal lines 21 exposed from the sheath pin 3 on the tip-end side are inserted into the cover 4 which is welded to the periphery of the sheath pin 3.

Figure 4:
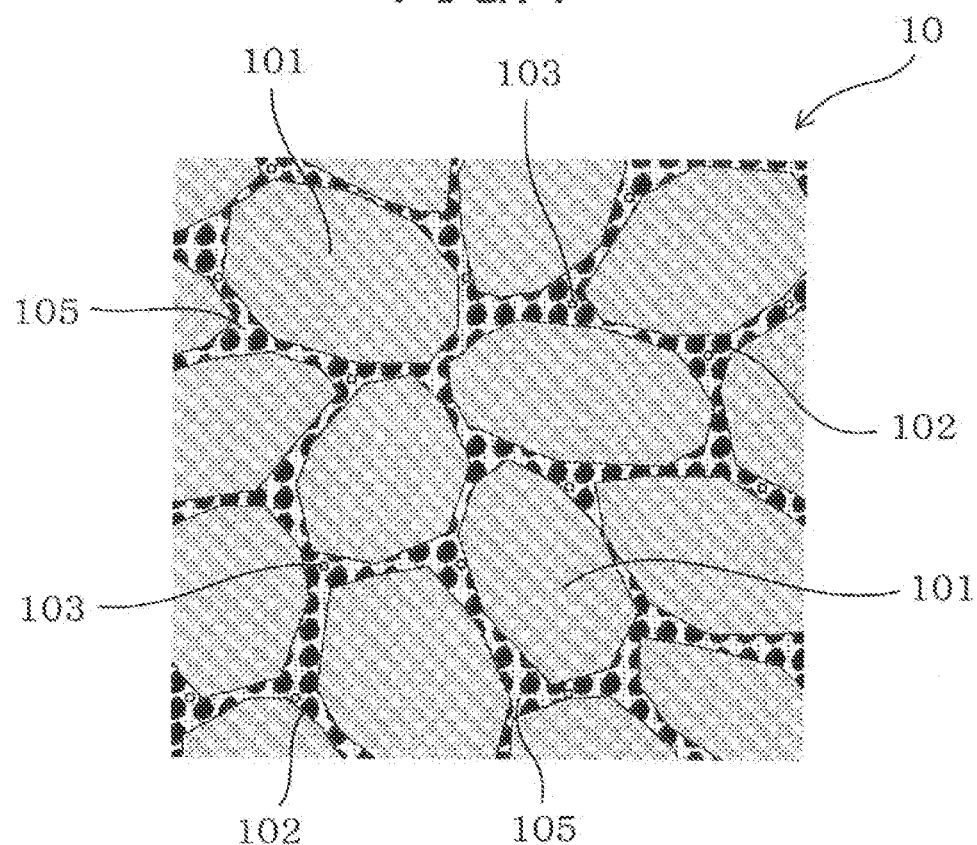
FIG. 4 is an explanatory view illustrating an internal structure of a thermistor of the temperature sensing element of the present invention.

The thermistor 10 is composed of Si-base ceramics that contains silicon nitride or silicon carbide as a matrix component. It is preferable that the thermistor 10 contains silicon carbide in addition to silicon nitride as a matrix component. The thermistor 10 obtained in this way may exert good mechanical characteristics and heat resistance. For example, the thermistor 10 that may be realized is composed such as of low thermal expansion ceramics having a linear expansion coefficient of about $3 \times 10^{-6}$ to $5 \times 10^{-6}/°$ C. Thus, bonding reliability is sufficiently ensured between each of the metal electrodes 11 and the thermistor 10. Containing both of silicon carbide and silicon nitride, the thermistor 10 used in the temperature sensing element 1 may preferably have a configuration as shown in FIG. 4. Specifically, the thermistor 10 may preferably have a configuration including crystal grains 101 composed of silicon nitride, a crystal grain boundary 105 composed of a crystallized glass phase or a glass phase and arranged around the crystal grains 101, and silicon carbide grains 102 and metal conductors 103, which are dispersed in the crystal grain boundary 105.

This is because such a configuration is able to form an electrically conductive path in the crystal grain boundary 105 of silicon nitride. In this case, the electrically conductive path makes use of the resistance of the silicon carbide (semiconductor) itself and the intergrain resistance (tunnel resistance) of the silicon carbide, as well as its temperature and electrical characteristics that the resistance changes with temperature. The thermistor 10 having such a configuration can realize a temperature sensor which is able to detect a temperature with good sensitivity in a wide temperature range such as of $-80°$ C. to $1200°$ C., in particular, $-50°$ C. to $1050°$ C. Begin composed of a composite material of ceramics having good heat resistance, the thermistor 10 is able to exert enhanced heat resistance. It should be appreciated that the crystal grain boundary composed of a glass phase recited in the claims refers to a crystal grain boundary composed of a crystallized glass phase or a glass phase as mentioned above.

Further, the crystal grain boundary 105 may preferably be dispersed with the metal conductors 103. In this case, the resistance value of the thermistor 10 is easily controlled to a desired value. For example, the metal conductors 103 may be grains of silicides, borides, nitrides and carbides of groups 4 to 6 of the periodic table, such as $TiB_2$, $VN$, $TiO_2$, $TiN_2$, $CrB_2$ and $WSi_2$.

The metal electrodes 11 formed on the respective surfaces of the thermistor 10 contain Cr and a metal element α that has a higher Si diffusion coefficient than Cr.

The difference in linear expansion coefficient between the metal electrode 11 and the thermistor 10 configured by Si-base ceramics is reduced by Cr contained in the metal electrodes 11. Recently, temperature sensors are required to be usable covering an extremely wide temperature range of about $-50°$ C. to $1050°$ C. Since Cr is included, the occurrence of cracks is reduced in the use of the wide temperature range, the cracks being ascribed to the difference in linear expansion coefficient between the metal electrode 11 and the thermistor 10.

Having a higher Si diffusion coefficient than Cr, the metal element α may produce a silicide compound much easier than Cr. In other words, the metal element α is diffused into the crystal grain boundary of the thermistor 10 to positively form a diffusion layer made of the silicide of the metal element α.

The metal element α may be selected such as from Fe, Mo, Ni, W, Zr, Nb and Ta.

From the viewpoint of reducing the difference, in linear expansion coefficient, from the thermistor 10 and of enhancing heat resistance, the metal electrode 11 is preferably made of an alloy that contains 30 to 90 mass % of Cr and 10 to 70 mass % of Fe. In particular, the alloy may more preferably contain 60 mass % of Cr and 40 mass % of Fe.

In this way, the metal electrode 11 and the like are suppressed from being oxidized under high-temperature conditions. Accordingly, heat resistance of the metal electrode 11 is more enhanced, while thermal stress is mitigated, which is ascribed to the difference in linear expansion coefficient between the thermistor 10 and the metal electrode 11, thereby ensuring bonding reliability. This is because addition of Fe to Cr allows selective oxidization of Cr that has low free energy of formation to form a more uniform oxide film, and thus because oxidization of the Cr—Fe alloy is suppressed from being advanced. Too much addition of Fe may not only deteriorate oxidization resistance, but also increase the linear expansion coefficient of the metal electrodes 11, thereby widening the difference in linear expansion coefficient from the thermistor 10. As a result, thermal stress is increased.

The alloy may further contain 0.5 to 7 mass % of Al to suppress the metal electrode 11 from being oxidized under high-temperature conditions. Thus, heat resistance of the metal electrode 11 is more enhanced. If the content of Al is less than 0.5 mass %, the effect of enhancing heat resistance is unlikely to be sufficiently exerted. On the other hand, if the content of Al exceeds 7 mass %, the effect of enhancing heat resistance is hardly exerted. On the contrary, the degree of hardness of the metal electrode 11 tends to be increased and thus to deteriorate processability thereof.

Figure 5:
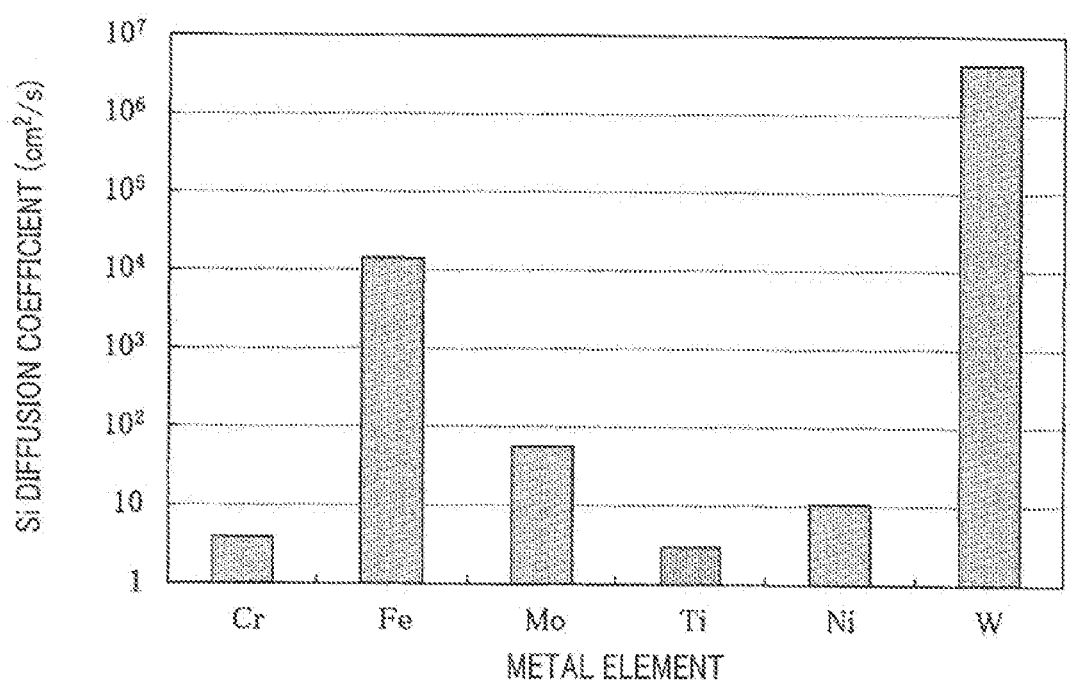
FIG. 5 is an explanatory view illustrating Si diffusion coefficient of various metal elements.

FIG. 5 shows Si diffusion coefficient of typical metal elements. The figure shows a bar chart in which the horizontal axis indicates metal element and the vertical axis indicates Si diffusion coefficient ($cm^2/s$).

Figure 6:
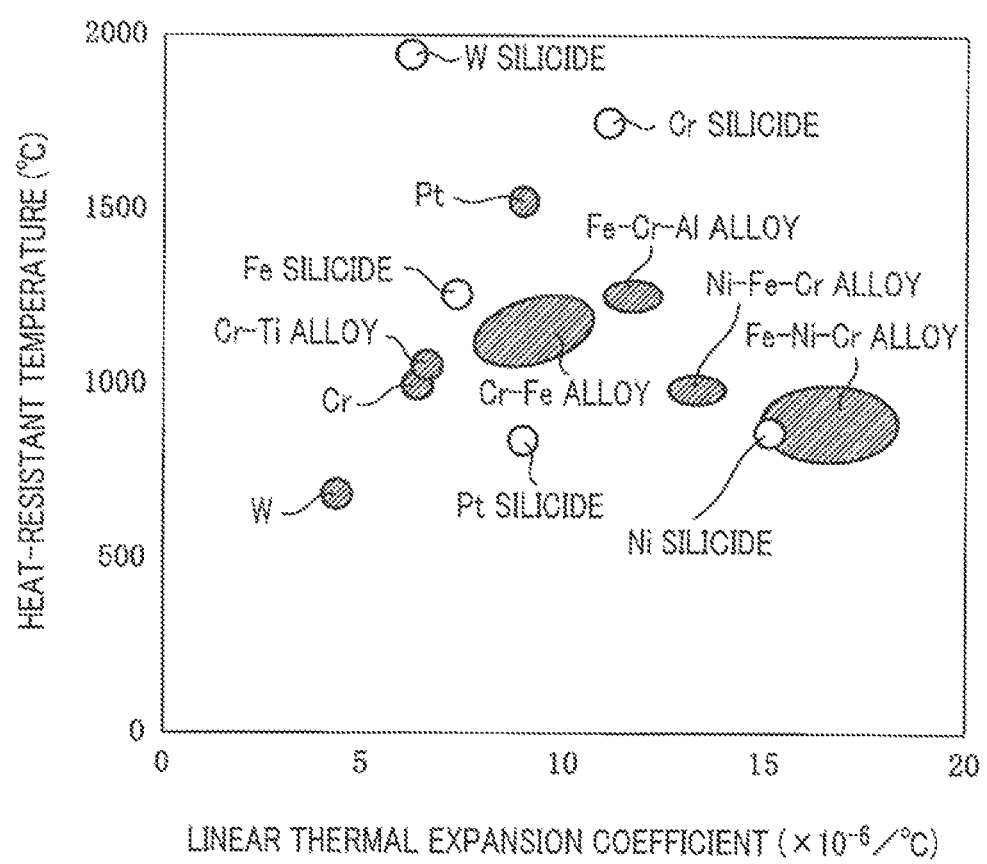
FIG. 6 is an explanatory view illustrating heat-resistant temperature and linear expansion coefficient of metals and metal silicides thereof.

FIG. 6 shows typical metals, as well as heat-resistant temperatures and linear expansion coefficients of the respective silicides of the metals. In the figure, the horizontal axis indicates linear expansion coefficient ($\times 10^{-6}/°$ C.) and the vertical axis indicates heat-resistant temperature ($°$ C.). In the figure, circled areas each indicate a linear expansion coefficient and a heat-resistant temperature that can be exhibited by each of the alloys, pure metals and silicides of the metals.

The metal electrode 11 may preferably have a linear expansion coefficient of equal to or less than $11 \times 10^{-6}/°$ C.

When the linear expansion coefficient exceeds $11 \times 10^{-6}/°$ C., use of a low-thermal-expansion ceramics as the thermistor 10 is likely to make it difficult to ensure bonding reliability between the metal electrode 11 and the thermistor 10. When the linear expansion coefficient of the metal electrode 11 is made excessively low, the temperature sensor, if it is configured by bonding the signal lines and the like to the respective metal electrodes 11, will suffer from a large difference in the linear expansion coefficient between the metal electrode 11 and the signal lines. Therefore, taking into account the possible increase of thermal stress generated on the bonded interface between the metal electrode 11 and the corresponding signal line, the metal electrode 11 may preferably have a linear expansion coefficient of equal to or more than $7 \times 10^{-6}/°$ C.

Use of a metal (e.g., noble metal, such as Pt) having a low linear expansion coefficient as the signal lines can further reduce the linear expansion coefficient of the metal electrodes 11. However, this may involve a problem of high cost. As a measure against this, a high-heat-resistant metal, such as Ni—Cr—Fe alloy or Fe—Cr—Al alloy, may be used as the signal lines, while the metal electrodes are permitted to have a linear expansion coefficient of $7 \times 10^{-6}/°$ C. or more. Use of such signal lines and metal electrodes is preferable from a viewpoint of not only obtaining satisfactory bonding reliability but also of realizing low cost.

For example, the linear expansion coefficient of the metal electrodes 11 is controlled by selecting the metal element α and adjusting a mixing ratio of the metal element α to be contained in the metal electrodes 11 in addition to Cr.

Each electrode 11 may preferably have a thickness of 3 to 110 μm. When the thickness is less than 3 μm, the strength of the metal electrode 11 may be insufficient, causing cracks in the metal electrode 11 due to thermal stress. On the other hand, when the thickness exceeds 110 μm, the stress due to the difference in linear expansion coefficient may be caused in the bonding interface, easily causing crack generation in the thermistor 10.

In the present invention, it is important that, in the diffusion layer 12 formed in the interface between the thermistor 10 and each metal electrode 11, the silicide of the metal element α which is contained in the metal electrode 11 is present in the crystal grain boundary of the Si-base ceramics that forms the thermistor 10.

As shown in FIG. 3, the diffusion layer 12 enhances the bonding properties between the thermistor 10 and the corresponding electrode 11, while ensuring ohmic contact.

The silicide of the metal element α has a low linear expansion coefficient and a low resistance value compared to the silicide of Cr. In such a relationship, the silicide of the metal element α functions as a thermal-stress buffer layer having a thermal expansion coefficient which is intermediate between the thermistor 10 and the metal electrode 11. At the same time, the silicide of the metal element α serves as the diffusion layer 12 having a low resistance of a level that will not inhibit the ohmic contact between the thermistor 10 and the metal electrode 11. Accordingly, the silicide of the metal element α can enhance the bonding strength between the thermistor 10 and the metal electrode 11 and ensure the "ohmic contact" to suppress the resistance of the temperature sensing element from being varied.

In particular, the metal element α used for composing the metal electrodes 11 may preferably be Fe. In this case, the metal element Fe reacts with Si in the crystal grain boundary (Si contained in the crystallized glass phase or the glass phase and Si contained in the grains of silicon carbide in the crystal grain boundary) of the thermistor 10 to form FeSi in the crystal grain boundary of the thermistor 10. FeSi will have a linear expansion coefficient which is intermediate between those of the thermistor 10 and the metal electrode 11. Accordingly, FeSi is able to buffer thermal stress induced by both of the thermistor 10 and the metal electrode 11 and enhance bonding properties.

In order to have the silicide of the metal element α be present in the crystal grain boundary of the Si-base ceramics composing the thermistor 10, the Si-base ceramics composing the thermistor 10 is required to have a large crystal grain boundary area to provide the thermistor 10 with a crystal structure that allows easy diffusion of the metal element α. To this end, the Si-base ceramics composing the thermistor 10 may preferably contain both of silicon carbide and silicon nitride.

Therefore, the silicon carbide grains 102 that easily react with the metal element α, such as Fe, may be diffused into the crystal grain boundary 105 in between the crystal grains 101 of silicon nitride. The silicon carbide grains 102 are positively diffused into the crystal grain boundary 105. It is more preferable that additive amount of silicon carbide is contained by 15 to 50 vol % and that of silicon nitride is contained by 50 to 85 vol %. Allowing the thermistor 10 to have a content of silicon carbide by 15 to 50 vol %, the silicon carbide grains 102 for forming the electrically conductive path positively enter in between the crystal grains 101 of silicon nitride. As a result, the thermistor 10 will have a large proportion of crystal grain boundary. The thermistor 10 may additionally contain a component $TiB_2$ to trap oxygen at the time of baking. This may allow the silicide of the metal element α to be easily present in the crystal grain boundary.

The presence or absence of the silicide of the metal element α in the crystal grain boundary can be confirmed using a TEM (Transmission Electron Microscope). The diffusion layer 12, as shown in FIG. 10, corresponds to a region where the silicide of the metal element α contained in the metal electrode 11 is mainly present in the crystal grain boundary of the Si-base ceramics composing the thermistor 10.

The diffusion layers 12 may each preferably have a thickness of 3 to 110 μm.

When each diffusion layer 12 has a thickness of less than 3 μm, the strength of the diffusion layer 12 will become insufficient and is likely to cause crack generation due to thermal stress. On the other hand, when the thickness exceeds 110 μm, the effect of buffering thermal stress, as a function of the diffusion layer 12, is deteriorated. When the thickness of the diffusion layer 12 that has a lower strength than the thermistor 10 is increased, the bonding strength may be lowered.

Hereinafter is described a method of manufacturing the temperature sensing element of the present invention, according to an example.

First, the thermistor 10 is prepared as follows.

A mixture material was obtained by blending 63.4 vol % of silicon nitride ($Si_3N_4$) powder having an average grain size of 0.7 μm, 30 vol % of silicon carbide (SiC) powder having an average grain size of 0.2 μm, 6 vol % of yttrium oxide, as a sintering aid, having an average grain size of 0.5 μm, and 0.6 vol % of $TiB_2$ powder, as metal conductors, having an average grain size of 0.4 μm, followed by mixing for 24 hours with ethanol using a ball mill.

Then, the mixture material was molded by means of uniaxial pressing at a pressure of 20 MPa, followed by performing hot pressing for one hour in a $N_2$ atmosphere at a temperature of 1850° C. and at a pressure of 20 MPa.

Important baking conditions for increasing the crystal grain boundary area in a sintered body of the thermistor 10 include: avoiding insufficient sintering so as not to cause voids that increase resistance variation; and avoiding excessive sintering by adjusting temperature, time, atmosphere, applied pressure and the like so as not to narrow the crystal grain boundary.

Thus, a parallelepiped (plate-like) sintered body was obtained as the thermistor 10, with its dimension being 1.0 mm in depth×1.0 mm in width×0.5 mm in height.

Then, as shown in FIGS. 7 (*a*) and (*b*1), a Cr—Fe alloy paste 110 that contained Cr by 60 mass % and Fe by 40 mass % was printed on the surfaces of the thermistor 10 in a thickness of about 100 μm, the surfaces being opposed to each other in the height direction thereof. The Cr—Fe alloy paste 110 included an alloy powder 119 having an average grain size (median size D50) of 50 μm or less as measured by a laser-diffraction grain size distribution measuring device.

When the alloy powder 119 has an average grain size of 50 μm or less, the thickness of each metal electrode 11 is easily controlled. When exceeding 50 μm, however, the thickness of each metal electrode 11 tends to become easily large exceeding 110 μm and increase thermal stress, resultantly causing cracks.

Besides printing, the metal electrodes 11 may be formed using thermal spraying, plating, a thermal transfer sheet, a dispenser, ink jetting, brush coating, compression molding, vapor deposition, a metal foil, or the like. From a viewpoint of workability and adhesion with an even thickness, it may be preferable that a paste of alloy powder is printed on a transfer sheet to thereby form each metal electrode 11 on the surface of the thermistor 10.

The thickness of the metal electrode 11 can be controlled by adjusting the amount of metal serving as the metal electrode 11 and arranged on the thermistor 10.

Then, heat treatment was conducted under predetermined conditions to form the metal electrodes 11 and the respective diffusion layers 12. The heat treatment was conducted by performing degreasing at a temperature of 400° C. and holding the resultant body for ten minutes at a temperature of 1150° C., while applying pressure of about 30 MPa to the alloy paste 110 formed on the surfaces of the thermistor 10, using SPS (Spark Plasma Sintering: a sintering process of applying pressure and current at the time of heat treatment) (see FIGS. 7 (b2) and (b3)).

The heat treatment may preferably be conducted at a temperature of 900 to 1300° C. The thickness of each diffusion layer 12 can be controlled by adjusting the temperature and the time of heat treatment. Specifically, the heating temperature is raised or the heating time is lengthened to advance diffusion, as 117, of the components of each metal electrode 11 into the thermistor 10. Thus, the thickness of each diffusion layer 12 is increased (see FIGS. 7 (b2) and (b3)).

The heat treatment may preferably be conducted in a vacuum or in an atmosphere of an inactive gas, such as nitrogen or argon, in order to prevent oxidization of the metal electrodes 11.

Further, the heat treatment may preferably be conducted with an application of a pressure and/or a voltage. Thus, as shown in FIGS. 7 (b1) to (b3), sintering properties of the metal serving as the metal electrodes 11 are enhanced. As a result, the diffusion 117 of the metal element α into the thermistor 10 is advanced. Moreover, since the heating temperature can be decreased, the damages caused by the heating to the thermistor 10 and the metal electrodes 11 are reduced, and in addition, the heating time is also shortened.

In this way, the temperature sensing element 1, as shown in FIG. 3, was obtained.

In the temperature sensing element 1, each diffusion layer 12 is formed in the bonding interface between the thermistor 10 and each metal electrode 11 as a result of the positive diffusion of the components of the metal electrode 11 into the crystal grain boundary of the thermistor 10. When the temperature sensing element 1 obtained in this way is used in the temperature sensor 5 described above and shown in FIG. 1, heat resistance and bonding reliability are ensured under high-temperature conditions. At the same time, owing to good ohmic contact characteristics with no variation in the resistance value, substantially balanced temperature detection is enabled covering a wide temperature range of −50° C. to 1050° C.

Figure 8:
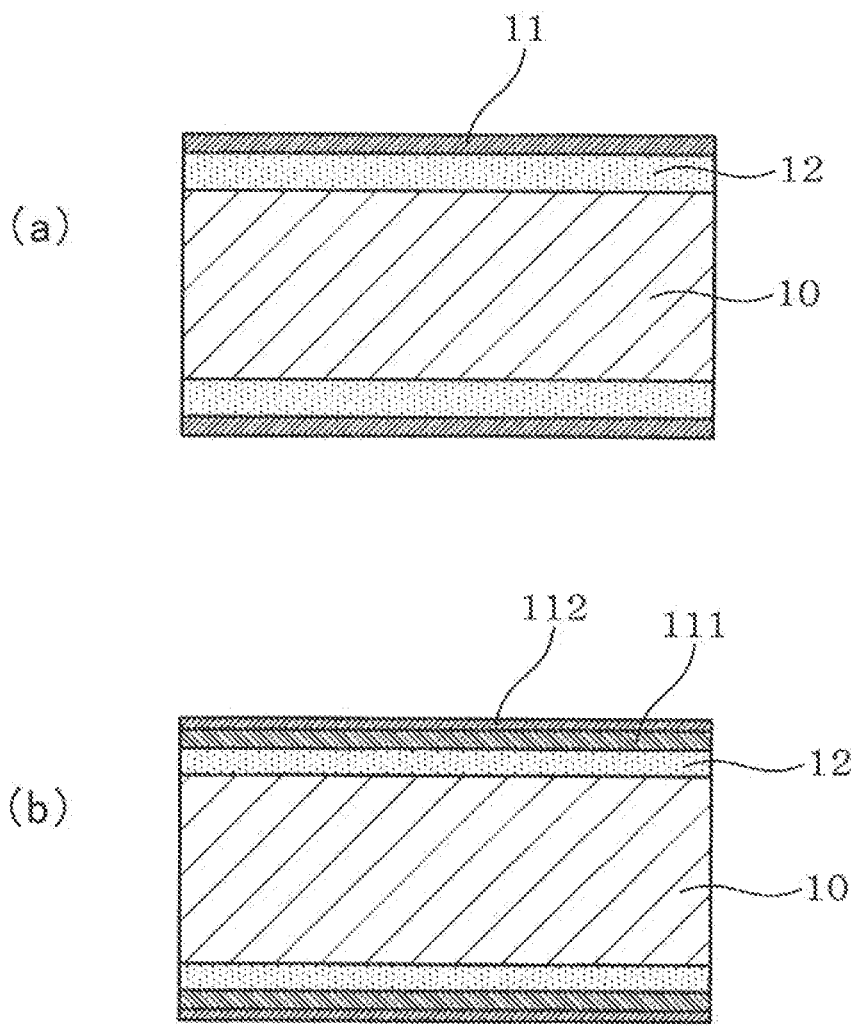
FIG. 8 (a) shows a cross-sectional view of a first embodiment of the temperature sensing element according to the present invention, and FIG. 8 (b) shows a cross-sectional view of a second embodiment of the temperature sensing element according to the present invention.
Figure 9:
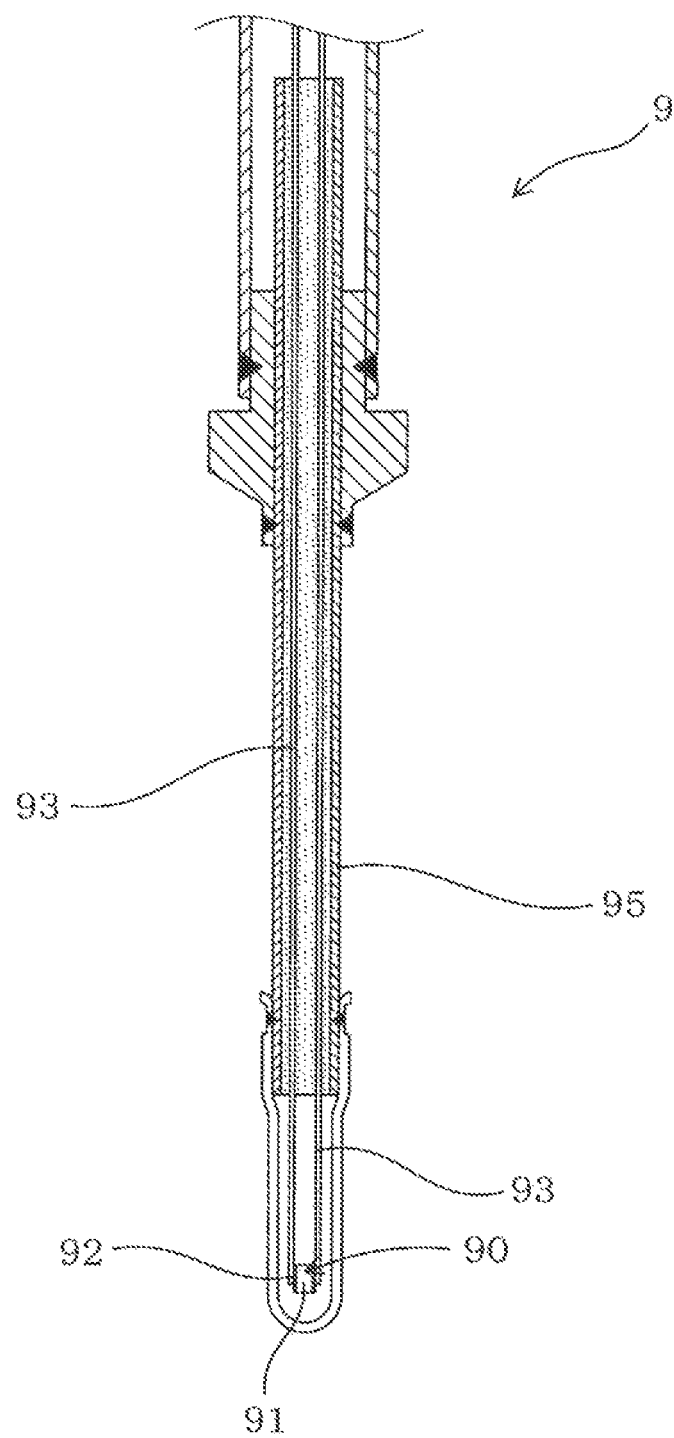
FIG. 9 is a partial front cross-sectional view illustrating a temperature sensor according to conventional art.

In a first embodiment of the temperature sensing element, the Cr—Fe alloy paste 110, for example, is printed first on the thermistor 10 that has been obtained in a manner similar to the manufacturing method described above. The Cr—Fe paste 110 is printed on the surfaces that are opposed to each other in the height direction of the thermistor, followed by heat treatment (see FIGS. 7 (b1) and (b2)). Through the heat treatment, the Cr—Fe alloy paste 110 is all diffused to form each diffusion layer 12 (see FIG. 8 (a)). After that, as shown in FIG. 8 (a), a metal foil made such as of a Fe—Cr—Al alloy may be bonded to the surface of the diffusion layer 12 to form the metal electrode 11. Thus, the diffusion layer 12 is formed with higher reliability and with less unevenness. In addition, the metal electrode 11 made up of a metal foil will have high oxidization resistance and exert high bonding strength when a lead is bonded onto the metal electrode 11.

In a second embodiment, the Cr—Fe alloy paste 110, for example, is printed first on the thermistor 10 that has been obtained in a manner similar to the manufacturing method described above. The Cr—Fe paste 110 is printed on the surfaces which are opposed to each other in the height direction of the thermistor 10, followed by heat treatment (see FIGS. 7 (b1) and (b2)). Through the heat treatment, a part of the Cr—Fe alloy paste 110 is diffused to form each diffusion layer 12, with another part thereof being formed as a first metal electrode 111 (see FIG. 8 (b)). After that, as shown in FIG. 8 (b), a metal foil made such as of a Fe—Cr—Al alloy may be bonded to the surface of the first metal electrode 111 to form a second metal electrode 112. Thus, the metal electrode is formed into a multilayer structure so that the diffusion layer 12 will have higher reliability and less unevenness. In addition, the metal electrode 11 made up of a metal foil will have high oxidization resistance and exert high bonding strength when a lead is bonded onto the metal electrode 11.

The Fe—Cr—Al alloy mentioned above may be SUH21 (JIS G4312) or the like. SUH21 is made up of 17 to 21 mass % of Cr, 2.0 to 4.0 mass % of Al, 0.10 mass % or less of C, 1.50 mass % or less of Si, 1.0 mass % or less of Mn, 0.040 mass % or less of P, 0.030 mass % or less of S, and Fe occupying the rest.

EXAMPLES

Various samples of temperature sensing element were prepared for evaluation and for confirmation of the effects of the present invention.

Experimental Example 1

First, samples X0 and X1 were prepared for evaluation.

For sample X1, i.e. a sample of the temperature sensing element of the present invention, the following mixture material was prepared as the thermistor 10. The mixture material was prepared by blending 63.4 vol % of silicon nitride ($Si_3N_4$) powder having an average grain size of 0.7 μm, 30 vol % of silicon carbide (SiC) powder having an average grain size of 0.2 μm, 6 vol % of yttrium oxide ($Y_2O_3$) powder, as a sintering aid, having an average grain size of 0.5 μm, and 0.6 vol % of $TiB_2$ powder, as metal conductors, having an average grain size of 0.4 μm, followed by mixing for 24 hours with ethanol using a ball mill.

Then, the mixture material was molded by means of uniaxial pressing at a pressure of 20 MPa, followed by performing hot pressing for one hour under a $N_2$ atmosphere at a temperature of 1850° C. and at a pressure of 20 MPa. Thus, a parallelepiped (plate-like) sintered body was obtained as the thermistor 10, with its dimension being 1.0 mm in depth×1.0 mm in width×0.5 mm in height.

Then, the Cr—Fe alloy paste 110 including Cr by 60 mass % and Fe by 40 mass % was printed onto the surfaces of the thermistor 10, which surfaces were opposed to each other in the height direction thereof, so as to have a thickness of about 30 μm. The alloy powder had an average grain size of 5 μm as measured by a laser-diffraction grain size distribution measuring device.

Then, heat treatment was conducted by performing degreasing at a temperature of 400° C. and holding the resultant body for ten minutes at a temperature of 1150° C., while applying pressure of 30 MPa to the alloy paste 110 formed on the surfaces of the thermistor 10, using SPS (Spark Plasma Sintering: a sintering process of applying pressure and current at the time of heat treatment), thereby obtaining sample X1.

Sample X0, i.e. a sample of the temperature sensing element of a comparative example, has a sintered body as the thermistor 10. The sintered body was prepared by blending 94 vol % of silicon nitride ($Si_3N_4$) powder having an average grain size of 0.7 μm, and 6 vol % of yttrium oxide ($Y_2O_3$) powder, as a sintering aid, having an average grain size of 0.5 μm, followed by processes similar to the above.

Then, an alloy paste serving as the metal electrodes 11 was printed onto the surfaces of the thermistor 10 through processes similar to the above. Then, with the resultant body being held, heat treatment was conducted for ten minutes at a temperature of 1350° C. using hot pressing, while a pressure of 10 MPa was applied to the alloy paste 110 formed on the surfaces of the thermistor 10 to achieve bonding between each electrode 11 and the thermistor 10.

The samples X1 and X0 were subjected to image analyses using an annular dark-field scanning transmission electron microscope (ADF-STEM (using JEM-2100F)) to observe each sample focusing on the interface between the metal electrode and the thermistor.

Figure 11:
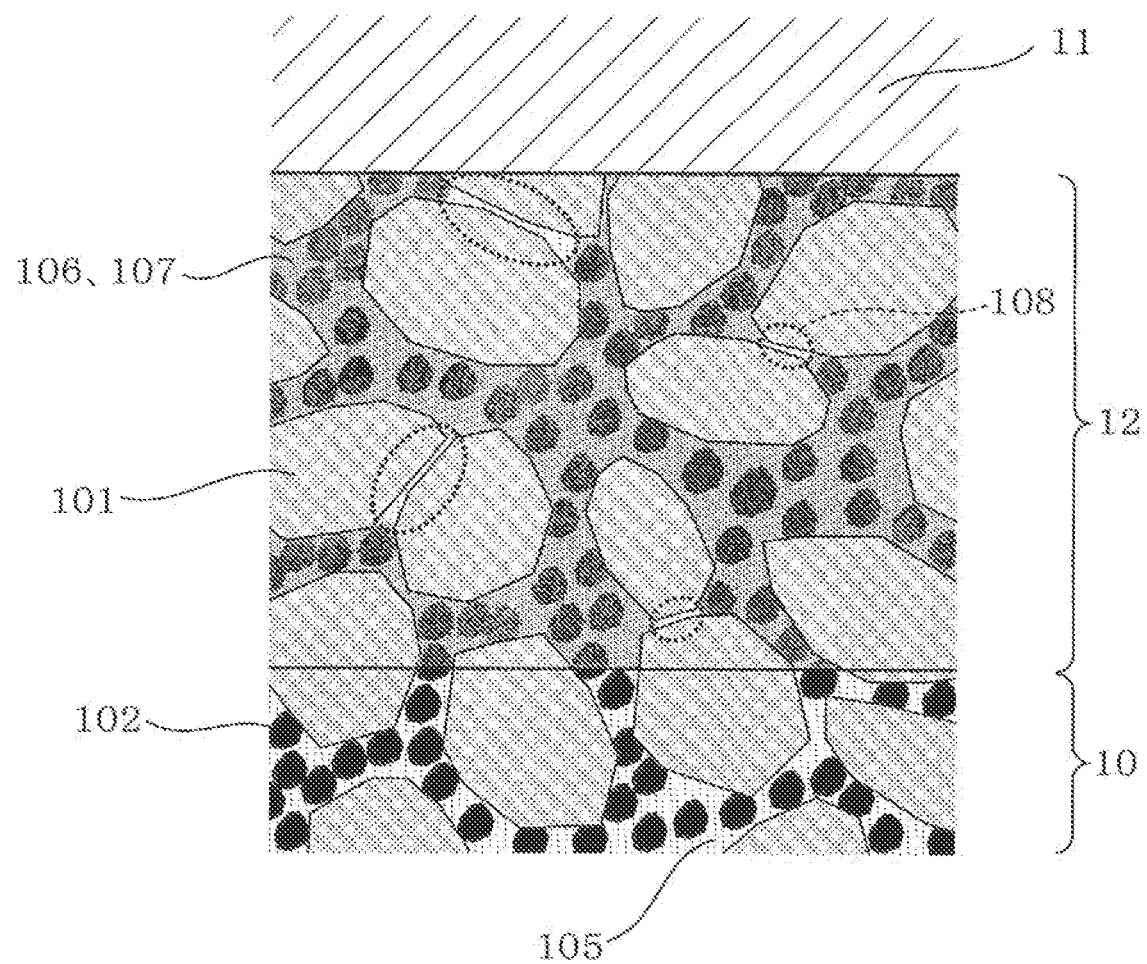
FIG. 11 is a model diagram illustrating an appearance of the diffusion layer in a boundary portion between a metal electrode and a thermistor according to the example of the temperature sensing element of the present invention.
Figure 12:
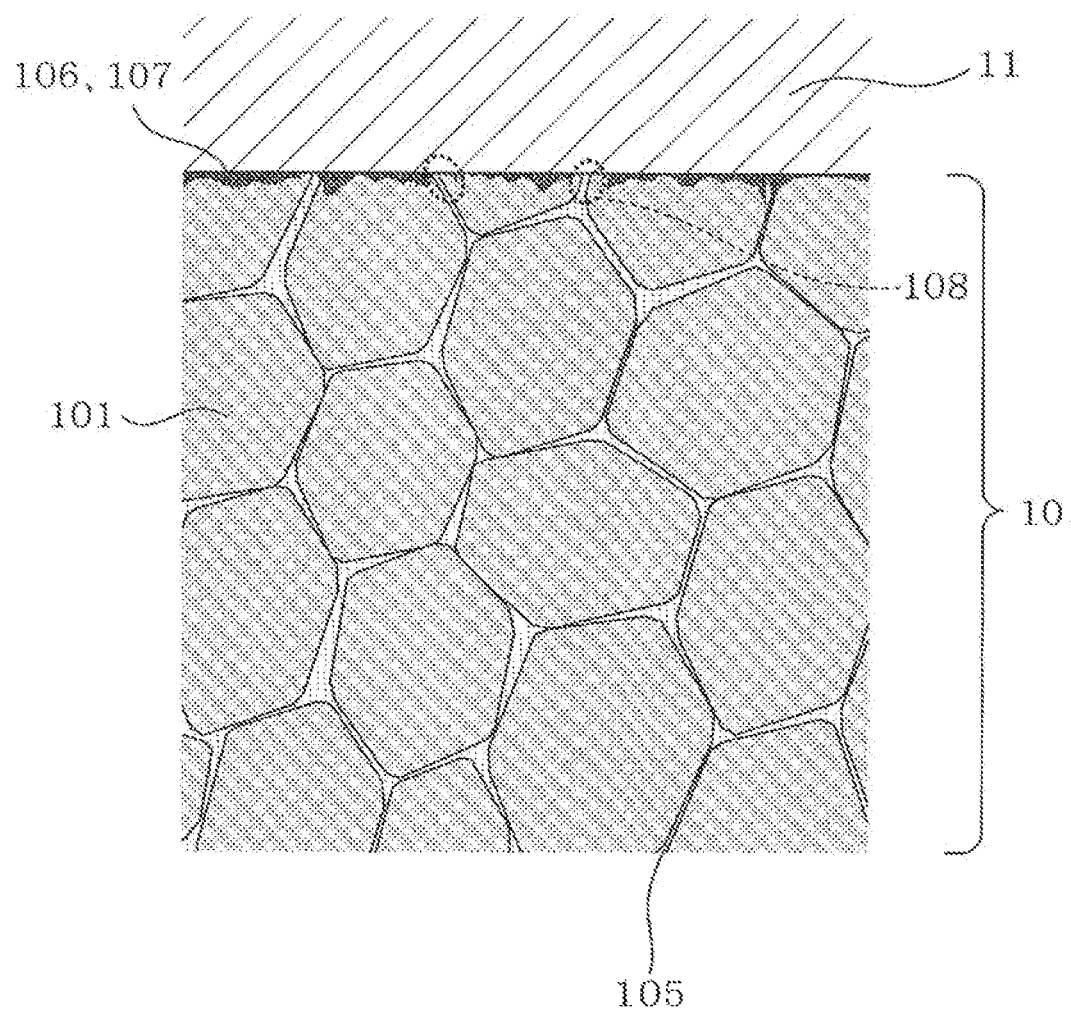
FIG. 12 is a model diagram illustrating an appearance of a diffusion layer in a boundary portion between a metal electrode and a thermistor according to a comparative example of the temperature sensing element of the present invention.

The results are shown in FIGS. 10 to 12.

FIG. 10 (a) shows an ADF-STEM image of the diffusion layer of sample X1 of the present invention. FIG. 10 (b) shows analysis results of an element (Cr) shown by FIG. 10 (a). FIG. 10 (c) shows analysis results of an element (Fe) shown by FIG. 10 (a). Further, FIG. 11 is a model diagram illustrating an appearance of a diffusion layer at a boundary portion between a metal electrode and the thermistor in sample X1 of the present invention. FIG. 12 is a model diagram illustrating an appearance of a diffusion layer at a bonding portion between a metal electrode and the thermistor in sample X0 of the comparative example.

As will be understood from FIGS. 10 and 11, sample X1 of the present invention has the crystal grains 101 of silicon nitride ($Si_3N_4$) and the grains 102 of silicon carbide (SiC). The crystal grain boundary 105 in between the crystal grains is formed with Fe silicide 107, Fe being the metal element α, and Cr silicide 106. The Fe silicide 107 and the Cr silicide 106 are formed reacting with the grains 102 of silicon carbide (SiC) that are present in the crystal grain boundary 105 in between the crystal grains 101 of silicon nitride ($Si_3N_4$). The diffusion of the Fe silicide 107 and the Cr silicide 106 is advanced to a depth of some degree from the interface at the metal electrode 11. On the other hand, as shown in FIG. 11, some non-diffusion areas 108 (in which no grains of silicon carbide (SiC) are present and the crystal grain boundary is extremely narrow) as circled by broken lines are present. However, when the diffusion reaches to some depth, only the grains 102 of silicon carbide (SiC) are present in the crystal grain boundary, but neither the Fe silicide 107 nor the Cr silicide 106 is seen. This boundary is the interface between the diffusion layer 12 and the thermistor 10.

In FIG. 11, the SiC grains 102 are illustrated as being located on the Fe silicide 107, i.e. the silicide of the metal element α, and the Cr silicide 106. However, as will be understood from FIG. 10 by (a), the SiC grains are present being taken into the Fe silicide and the Cr silicide.

On the other hand, as shown in FIG. 12, sample X0 of the comparative example includes the crystal grains 101 of silicon nitride ($Si_3N_4$) and the crystal grain boundary 105 in between. The crystal grains 101 and the crystal grain boundary 105 are formed with the Fe silicide 107, Fe being the metal element α, and the Cr silicide 106. However, it was found that the Fe silicide 107 and the Cr silicide 106 were formed being diffused into only a very small area near the interface of the thermistor 10, with large variation in the state of diffusion. Further, it was also found that sample X0 of the comparative example subjected to heat treatment at a temperature of 1350° C. allowed oxidization of the metal electrodes 11 to increase the resistance value thereof. On the other hand, it was further found that, when the temperature of heat treatment was lowered (e.g. 1150° C. as in sample X1) to mitigate oxidization, diffusion layers were not formed at all, and thus bonding strength was not ensured.

Experimental Example 2

First, samples X1 to X10 were prepared for evaluation.

For sample X1, the following mixture material was prepared as the thermistor 10. The mixture material was prepared by blending 63.4 vol % of silicon nitride ($Si_3N_4$) powder having an average grain size of 0.7 μm, 30 vol % of silicon carbide (SiC) powder having an average grain size of 0.2 μm, 6 vol % of yttrium oxide ($Y_2O_3$) powder, as a sintering aid, having an average grain size of 0.5 μm, and 0.6 vol % of $TiB_2$ powder, as metal conductors, having an average grain size of 0.4 μm, followed by mixing for 24 hours with ethanol using a ball mill.

Then, the mixture material was molded by means of uniaxial pressing at a pressure of 20 MPa, followed by performing hot pressing for one hour in a $N_2$ atmosphere at a temperature of 1850° C. and at a pressure of 20 MPa. Thus, a parallelepiped (plate-like) sintered body was obtained as the thermistor 10, with its dimension being 1.0 mm in depth×1.0 mm in width×0.5 mm in height.

Then, the Cr—Fe alloy paste 110 including Cr by 60 mass % and Fe by 40 mass % was printed onto the surfaces of the thermistor 10 so as to have a thickness of about 30 μm, the surfaces being opposed to each other in the height direction thereof. The alloy powder had an average grain size of 5 μm as measured by a laser-diffraction grain size distribution measuring device.

Then, heat treatment was conducted by performing degreasing at a temperature of 400° C. and holding the resultant body for ten minutes at a temperature of 1150° C., while applying pressure of 30 MPa to the alloy paste 110 formed on the surfaces of the thermistor 10, using SPS (Spark Plasma Sintering: a sintering process of applying pressure and current at the time of heat treatment), thereby obtaining sample X1.

In the present example, seven more temperature sensing elements (samples X2 to X8) were prepared changing the metal of the alloy paste (see Table 1). The temperature sensing elements were prepared in a manner similar to sample X1 except that the material of the alloy paste as the metal electrodes 11 was changed.

The temperature sensing elements were prepared by printing a paste of Cr powder in sample X2, a paste of Cr-10Ti alloy powder in sample X3, a paste of Fe-25Cr-5Al alloy powder in sample X4, a paste of Fe-20Ni-25Cr alloy powder in sample X5, a paste of Ni-15.5Fe-8.5Cr alloy powder in sample X6, a paste of W powder in sample X7, and a paste of Pt powder in sample X8.

Samples X1 to X8 were evaluated as follows.

Table 1 shows linear expansion coefficient of the metal electrodes in the temperature sensing elements of the respective samples. The linear expansion coefficient was measured on the basis of an isothermal holding measurement method (JIS Z 2285) using a thermal mechanical analyzer.

Then, the temperature sensing elements of samples X1 to X8 were evaluated as follows as to bonding reliability, heat resistance and ohmic contact characteristics.

"Bonding Reliability"

The samples (samples X1 to X8) were held for two minutes at a temperature of 1050° C., followed by holding them for two minutes at a normal temperature (about 25° C.). With this temperature cycle as being one cycle, the temperature cycle was repeated for 1000 times (temperature cycle test). Then, the occurrence of separation of the metal electrodes or the occurrence of crack generation in the metal electrodes and the thermistor was observed through a magnification microscope (appearance) and a metallographic microscope (cross section).

The samples in which no separation or crack generation was observed were evaluated with a mark "O". The samples in which a considerable separation or crack generation was observed were evaluated with a mark "X". The samples in which separation or cracks was observed but with a small extent were evaluated with a mark "Δ". The results are shown in Table 1.

"Heat Resistance"

The samples (samples X1 to X8) were left standing in a high-temperature furnace at a temperature of 1050° C. for 500 hours (high-temperature exposure test). After that, the samples were examined as to the occurrence of melting or oxidization in the metal electrodes or the diffusion layers through cross-section observation using a metallographic microscope. The samples in which no oxidization, melting or the like was observed after the heating in the high-temperature furnace compared to the state before being heated were evaluated with a mark "O". The samples in which considerable melting or oxidization was observed were evaluated with a mark "X". The samples in which melting or oxidization was observed but with a small extent were evaluated with a mark "Δ". The results are shown in Table 1.

"Ohmic Contact Characteristics"

The resistance of the thermistor of each of the samples was measured before and after conducting the tests of bonding reliability and heat resistance. Regarding the samples before the tests, an evaluation with a mark "O" was given to those which had a resistance variation of 5% or less in the thermistor after being bonded to the metal electrodes, with respect to the resistance of the thermistor before being bonded to the metal electrodes. An evaluation with a mark "X" was given to those which had a resistance variation of 100% or more. An evaluation with a mark "Δ" was given to those which had a resistance variation exceeding 5% but less than 100%. Further, regarding the samples after the tests, an evaluation with a mark "O" was given to those which had a resistance variation of 5% or less in the thermistor, with respect to the resistance of the thermistor before being tested. An evaluation with a mark "X" was given to those which had a resistance variation of 100% or more. An evaluation with a mark "Δ" was given to those which had a resistance variation exceeding 5% but less than 100%. The results are shown in Table 1.

Evaluation (after the tests) was conducted of either the resistance variation after the test of bonding reliability (temperature cycle test), or the resistance variation after the test of heat resistance (high-temperature exposure test), whichever was larger.

TABLE 1

| Sample No. | Metal Electrodes | Thermal Expansion Coefficient ($\times 10^{-6}$/° C.) | Ohmic Contact Characteristics Before Tests | Ohmic Contact Characteristics After Tests | Bonding Reliability | Heat Resistance |
|---|---|---|---|---|---|---|
| X1 | Cr—Fe alloy | 9.0 | O | O | O | O |
| X2 | Cr | 6.5 | Δ | Δ | Δ | Δ |
| X3 | Cr—Ti alloy | 6.7 | Δ | Δ | Δ | Δ |
| X4 | Fe—Cr—Al alloy | 11.4 | O | Δ | Δ | O |
| X5 | Fe—Ni—Cr alloy | 16 | O | X | X | X |
| X6 | Ni—Fe—Cr alloy | 13 | O | X | X | X |
| X7 | W | 4.5 | X | X | O | X |
| X8 | Pt | 8.8 | O | Δ | O | X |

As shown in Table 1, good evaluation was achieved in all of bonding reliability, heat resistance and ohmic contact characteristics by sample X1 which was provided with the metal electrodes of Cr—Fe alloy that contained Cr and Fe that was a metal element having a Si diffusion coefficient higher than that of Cr, and had a linear expansion coefficient of $11\times10^{-6}$/° C. or less.

FIG. 6 is a graph collectively indicating heat-resistant temperature and linear expansion coefficient, based on the evaluations of the present experimental example, of the metals used for the electrode and metal silicide layers formed as the diffusion layer.

Sample X2 that uses Cr has a linear expansion coefficient near that of the thermistor ($4.5\times10^{-6}$/° C.) and thus is considered to mitigate thermal stress. However, as a result of the temperature cycle test, sample X2 was recognized to cause separation of the electrodes. This is because, as shown in FIG. 6, the Cr silicide formed as a diffusion layer has a high linear expansion coefficient. This means that, Cr silicide does not exhibit satisfactory bonding reliability unless a suitable diffusion layer is formed. On the other hand, in the high-temperature exposure test, Cr as the electrode was oxidized and thus was found not to exhibit satisfactory heat resistance. Regarding ohmic contact characteristics as well, Cr of sample X2 does not allow the temperature sensing element to sufficiently exert its functions due to the variation of the resistance value, which is ascribed to the separation and oxidation of the electrodes.

In this regard, as shown in Table 1, sample X1 that uses a Cr—Fe alloy is good in all of bonding reliability, heat resistance and ohmic contact characteristics. This is because, as shown in FIG. 5, Cr is added with Fe that has a Si diffusion coefficient smaller than that of Cr and the diffusion layer is formed with not only the Cr silicide but also the Fe silicide having a low thermal expansion, and thus the linear expansion coefficient of the diffusion layer is lowed and oxidization of Cr is suppressed. Accordingly, in sample X1, the metal electrodes are prevented from being separated and oxidized. Further, sample X1 is able to sufficiently ensure ohmic contact characteristics after the temperature cycle test and the high-temperature exposure test.

A point of reliably forming a suitable diffusion layer is, as mentioned above, to add an element having a Si diffusion coefficient higher than that of Cr. As shown in FIG. 6, Fe has a Si diffusion coefficient higher than that of Cr. Accordingly, use of a Cr—Fe alloy as a material of the electrode can reliably ensure formation of the Fe silicide. On the other hand, addition of Ti that is an element having a Si diffusion coefficient lower than that of Cr allows most of the diffusion layer to be formed by the Cr silicide and thus no suitable diffusion layer is obtained. As a matter of fact, as will be understood from Table 1, in sample X3 that uses a Cr—Ti alloy, bonding reliability is not sufficiently ensured.

As will be seen from Table 1, sample X4 uses a Fe—Cr—Al alloy, sample X5 uses a Fe—Ni—Cr alloy, and sample X6 uses a Ni—Fe—Cr alloy. These samples are added with an element (Fe) having a higher Si diffusion coefficient than Cr. Accordingly, each of these samples is reliably formed with suitable diffusion layers and thus exhibits good ohmic contact characteristics before the tests. However, causing separation in the temperature cycle test, these samples are not sufficiently satisfactory in bonding reliability. This is because, in spite of the formation of the Fe silicide as the diffusion layer, the metal electrode has a high linear expansion coefficient and thus the generation thermal stress is not sufficiently reduced. In samples X5 and X6, not only the Fe silicide but also a Ni silicide is formed as the diffusion layer. However, as shown in FIG. 6, such a Ni silicide has low heat-resistant temperature and thus is not able to achieve satisfactory heat resistance.

Sample X7 has a linear expansion coefficient that substantially coincides with the linear expansion coefficient of the thermistor. Accordingly, sample X7 is imposed with extremely small thermal stress and thus exhibits satisfactory bonding reliability. However, as shown in FIG. 6, W that forms the electrode has a low oxidation resistance temperature. Accordingly, sample X7 suffered from serious oxidization in the electrode and thus was not able to exhibit satisfactory heat resistance, thereby allowing large change in the resistance value.

Sample X8 using Pt also has a linear expansion coefficient comparatively approximate to the linear expansion coefficient of the thermistor. Accordingly, sample X8 has small thermal stress and thus exhibits satisfactory bonding reliability. However, as shown in FIG. 6, Pt that forms the electrode has a high heat-resistant temperature, while a Pt silicide forming the diffusion layer has a low heat-resistant temperature. Therefore, sample X8 was not able to achieve satisfactory heat resistance.

As set forth above, the temperature sensing element of the present invention (sample X1) was found to ensure heat resistance and bonding reliability under high temperature conditions. At the same time, sample X1 was found to have good ohmic contact characteristics and enable substantially balanced and stable temperature detection.

Experimental Example 3

In the present experimental example, characteristics changes of temperature sensing elements are discussed, in the case where the metal electrode has a different mixing ratio of Cr and Fe. In the present experimental example, as will be shown in Table 2 discussed later, seven different temperature sensing elements (samples X9 to X15) were prepared using alloy powders having a different mixing ratio of Cr and Fe. The samples were each prepared in a manner similar to sample X1 described above, except that the material of an alloy paste forming the metal electrode 11 is different.

The temperature sensing elements were prepared by printing a paste of Cr-5Fe alloy powder in sample X9, a paste of Cr-10Fe alloy powder in sample X10, a paste of Cr-25Fe alloy powder in sample X11, a paste of Cr-40Fe alloy powder in sample X12, a paste of Cr-55Fe alloy powder in sample X13, a paste of Cr-70Fe alloy powder in sample X14, and a paste of Cr-85Fe alloy powder in sample X15.

Similar to experimental example 1, the samples (samples X9 to X15), after their linear expansion coefficient being measured, were evaluated as to bonding reliability, heat resistance and ohmic contact characteristics.

Figure 13:
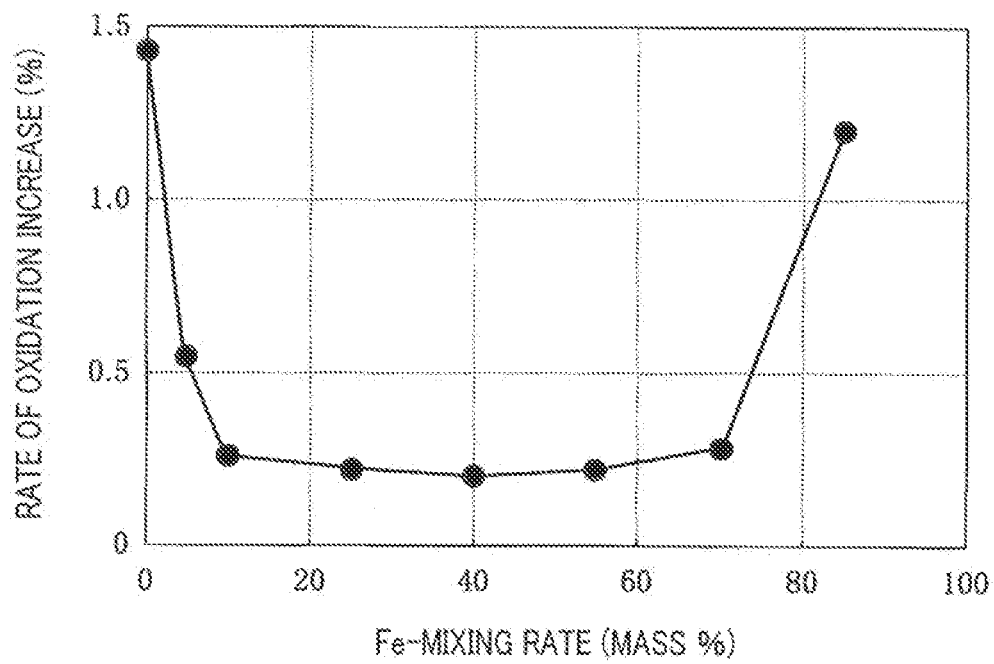
FIG. 13 is an explanatory view illustrating a relationship of rate of oxidation increase (%) before and after a high-temperature exposure test (heat resistance evaluation) with respect to Fe-mixing rate (mass %) in a Cr—Fe alloy, according to a third experimental example.

The evaluations are shown in Table 2. FIG. 13 shows a relationship of rate of oxidation increase (%) before and after a high-temperature exposure test (evaluation of heat resistance), with respect to Fe-mixing ratio (mass %) in a Cr—Fe alloy. The rate of oxidation increase was calculated using the weight of each of the samples measured before and after the high-temperature exposure test, on the basis of an equation:

Rate of oxidation increase=(weight after test−weight before test)/weight before test

TABLE 2

| Sample No. | Metal Electrodes | Thermal Expansion Coefficient ($\times 10^{-6}/°$ C.) | Bonding Reliability | Heat Resistance | Ohmic Contact Characteristics (After Tests) |
|---|---|---|---|---|---|
| X9 | Cr—5Fe | 6.9 | ◯ | △ | △ |
| X10 | Cr—10Fe | 7.2 | ◯ | ◯ | ◯ |
| X11 | Cr—25Fe | 8.1 | ◯ | ◯ | ◯ |
| X12 | Cr—40Fe | 9 | ◯ | ◯ | ◯ |
| X13 | Cr—55Fe | 9.8 | ◯ | ◯ | ◯ |
| X14 | Cr—70Fe | 11 | ◯ | ◯ | ◯ |
| X15 | Cr—85Fe | 11.7 | △ | △ | △ |

As will be understood from Table 2, samples X10 to X14 using a Cr—Fe alloy that contained Fe in the metal electrodes by 10 to 70 mass % obtained satisfactory evaluations in all of the items. On the contrary, as will also be understood from Table 2, sample X9 using Cr-5Fe alloy and sample 15 using Cr-85Fe allowed lowering of at least heat resistance. This is because, as shown in FIG. 13, the metal electrodes are oxidized when a Fe-mixing ratio in the Cr—Fe alloy is less than 10 mass % and more than 70 mass %.

Further, as will be understood from Table 2, sample X15 using Cr-85Fe alloy caused slight separation of the metal electrodes in the temperature cycle test. This is because Cr-85Fe alloy has a high linear expansion coefficient and thus is not able to sufficiently reduce thermal stress. On the other hand, sample X14 using Cr-70Fe alloy ensures bonding reliability. Accordingly, it is considered that, with a linear expansion coefficient being $11 \times 10^{-6}/°$ C. or less, thermal stress is sufficiently reduced and satisfactory bonding reliability is exerted.

In the present experimental example, oxygen-resistivity enhancing effects were examined, in the case where Al was mixed into Cr-40Fe alloy. The results are shown in FIG. 14.

Figure 14:
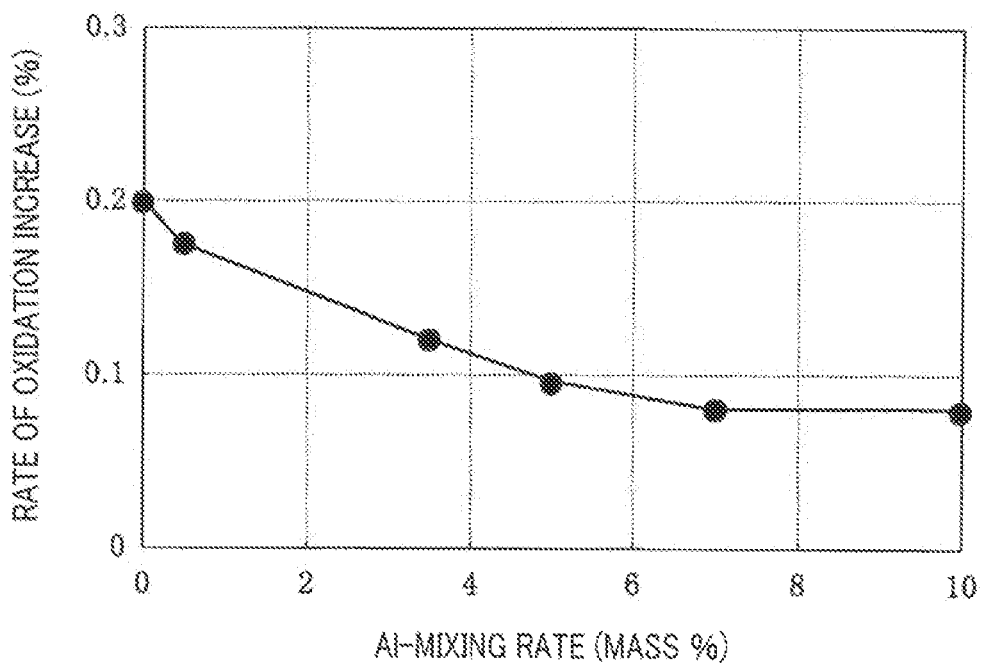
FIG. 14 is an explanatory view illustrating a relationship of Al-mixing rate in a metal electrode with respect to rate of oxidation increase (%) before and after the high-temperature exposure test, according to the third experimental example.

As will be seen from FIG. 14, addition of Al by 0.5 mass % or more can suppress oxidation increase to thereby enhance heat resistance of the electrodes. Further, addition of Al by more than 7 mass % does not show any change in the effects but tends to deteriorate processability. Accordingly, an Al-mixing ratio may preferably be 7 mass % or less. FIG. 14 exemplifies Cr-40Fe. It was confirmed that the Cr—Fe alloys having a Fe-mixing ratio ranging from 10 mass % (Cr-10Fe alloy) to 70 mass % (Cr-70Fe alloy) showed similar results. It should be appreciated that not only heat resistance but also bonding reliability and ohmic contact characteristics are sufficiently satisfactory.

Experimental Example 4

Here, fifteen different temperature sensing elements (samples X16 to X30) are prepared to examine their characteristics change. These samples have a different thickness in the metal electrode and a different thickness in the diffusion layer.

Specifically, samples X16 to X30 were obtained in a manner similar to experimental example 1 with a change in the amount of coating of a paste of alloy powder and the time of heating the paste so that the thickness of the metal electrode and the diffusion layer would have a value as shown in Table 3 which will be discussed later. The temperature sensing elements of the samples (samples X16 to X30) were prepared in a manner similar to sample X1 of experimental example 1 except that the thickness of the metal electrode and the diffusion layer was changed.

A thickness t1 of the metal electrode 11 and a thickness t2 of the diffusion layer 12 can be confirmed through the observation using a scanning electron microscope (SEM) (see (a) of FIG. 15 described later). Similar to experimental example 1, the samples (samples X16 to X30) were evaluated as to bonding reliability, heat resistance and ohmic contact characteristics.

The results are shown in Table 3.

TABLE 3

| Sample No. | Thickness of Metal Electrode (μm) | Thickness of Diffusion Layer (μm) | Bonding Reliability | Heat Resistance | Ohmic Contact Characteristics (After Tests) |
|---|---|---|---|---|---|
| X16 | 1 to 2 | 1 to 2 | Δ | X | X |
| X17 | 3 | 3 | ○ | ○ | ○ |
| X18 | 11 | 6 | ○ | ○ | ○ |
| X19 | 12 | 18 | ○ | ○ | ○ |
| X20 | 28 | 9 | ○ | ○ | ○ |
| X21 | 31 | 28 | ○ | ○ | ○ |
| X22 | 62 | 35 | ○ | ○ | ○ |
| X23 | 56 | 50 | ○ | ○ | ○ |
| X24 | 103 | 15 | ○ | ○ | ○ |
| X25 | 101 | 32 | ○ | ○ | ○ |
| X26 | 106 | 63 | ○ | ○ | ○ |
| X27 | 108 | 101 | ○ | ○ | ○ |
| X28 | 120 | 55 | Δ | ○ | Δ |
| X29 | 122 | 115 | Δ | ○ | Δ |
| X30 | 148 | 128 | X | ○ | X |

As shown in Table 3, bonding reliability was insufficient in sample X16 having the electrode with a thickness of 1 to 2 μm and the diffusion layer with a thickness of 1 to 2 μm. This is because, the metal electrode having a metal electrode coating of an excessively small thickness had insufficient strength which, being coupled with thermal stress, caused cracks in the electrode. Sample X16 does not have fully satisfactory heat resistance, either. This is because the excessively small thickness of the metal electrode allowed advancement of oxidization from the surface of the metal electrode to the thermistor. As a result, the resistance value became extremely large and thus ohmic contact characteristics were not ensured any more.

On the other hand, in sample X28, the metal electrode has a large thickness exceeding 110 μm. Also, in samples X29 and X30, the metal electrode and the diffusion layer have a large thickness exceeding 110 μm. These samples exhibit satisfactory heat resistance but do not exhibit fully satisfactory bonding reliability. This is because the stress generated on the bonding interface was increased, thereby inducing cracks in the thermistor.

On the other hand, in samples X17 to X27, the metal electrode and the diffusion layer have a thickness of 3 to 110 μm. These samples exhibited satisfactory ohmic contact characteristics without causing any problem such as of separation, crack generation or oxidization after the temperature cycle test and the high-temperature exposure test.

Then, the temperature sensing element of sample X19 was examined as to the conditions of the bonding interface between the metal electrode and the thermistor. Specifically, the bonding interface of sample X19 was observed using a scanning electron microscope (SEM). The results are shown in FIG. 15 (a). Further, energy dispersive X-ray fluorescence analysis (EDX) was conducted of Si, Cr and Fe. The analyses of Si, Cr and Fe are shown in FIGS. 15 (b), (c) and (d), respectively.

As will be seen from FIG. 15 (a), in the bonding interface of sample X19, the diffusion layer 12 is formed, achieving diffusion bonding between the metal electrode 11 and the thermistor 10.

Further, as will be seen from FIGS. 15 (b) to (d), Si as a component of the thermistor and Cr and Fe as components of the metal electrode are diffused in the bonding interface between the metal electrode 11 and the thermistor 10 to form a metal silicide composed of the Cr silicide and the Fe silicide.

The present invention is not limited to the embodiments described above but may be modified in various manners without departing from the spirit of the present invention.

EXPLANATION OF REFERENCES 1, 90: Temperature sensing element
10, 91: Thermistor
11, 92: Metal electrodes
12: Diffusion layers
3, 95: Sheath pin
33: Insulating member
34: Outer tube member
301: Tip end portion
4: Cover
5: Temperature sensor
21, 93: Signal lines
93: Signal lines
120: Rib
121: Contact portion
122: Rearward extension portion
123: Forward extension portion
13: Protective tube
101: Crystal grains of silicon nitride
102: Grains of silicon carbide
103: Metal conductors
105: Crystal grain boundary composed of crystallized glass phase

The invention claimed is:

1. A temperature sensing element comprising:
a thermistor that has electrical characteristics which change with temperature; and
a pair of metal electrodes that are bonded onto a surface of the thermistor,
wherein:
the thermistor is composed of Si-base ceramics including silicon nitride which is a matrix component and silicon carbide which is contained in the silicon nitride;
the pair of metal electrodes include Cr and a metal element that has a Si diffusion coefficient higher than that of Cr; and
a diffusion layer, in which a silicide of the metal element is present in a crystal grain boundary of the Si-base ceramics that configures the thermistor, is formed in an interface between the thermistor and the pair of the metal electrodes wherein the pair of the metal electrodes have a liner expansion coefficient of $11 \times 10^{-6}/°$ C. or less.

2. The temperature sensing element according to claim 1, wherein,
in the diffusion layer, the silicide of the metal element and a Cr silicide are present in the crystal grain boundary of the Si-base ceramics.

3. The temperature sensing element according to claim 1, wherein:
the temperature sensing element includes crystal grains of the silicon nitride, a crystal grain boundary composed of a glass phase which is arranged around the crystal grains, and grains of silicon carbide dispersed in the crystal grain boundary.

4. The temperature sensing element according to claim 3, wherein
the silicide of the metal element and the Cr silicide are arranged, reacting with the grains of the silicon carbide dispersed in the crystal grain boundary.

5. The temperature sensing element according to claim 1, wherein the metal element is Fe.

6. The temperature sensing element according to claim 1, wherein the pair of metal electrodes are composed of an alloy that contains 30 to 90 mass % Cr and 10 to 70 mass % Fe.

7. The temperature sensing element according to claim 1, wherein
the pair of metal electrodes have a thickness of 3 to 110 μm.

8. The temperature sensing element according to claim 1, wherein
the diffusion layer has a thickness of 3 to 110 μm.

9. A method of manufacturing a temperature sensing element according to claim 1, comprising:
bonding a metal electrode, which contains Cr and a metal element having a Si diffusion coefficient higher than that of Cr, to a thermistor composed of Si-base ceramics by using a step of conducting heat treatment under a condition that a metal configured by the metal electrode is located on a surface of the thermistor; and
forming a diffusion layer in which a silicide of the metal element is present by diffusing the metal element into a crystal grain boundary of the Si-base ceramics, in a bonding interface between the thermistor and the metal electrode.

10. The method of manufacturing a temperature sensing element according to claim 9, wherein
the metal configuring the metal electrode is an alloy powder having an average grain size of 50 μm or less.

11. The method of manufacturing a temperature sensing element according to claim 9, wherein
the heat treatment is conducted in a vacuum or in an atmosphere of an inactive gas.

12. The method of manufacturing a temperature sensing element according to claim 9, wherein
the heat treatment is conducted with application of pressure and/or voltage.

13. A temperature sensor wherein
the temperature sensor comprises the temperature sensing element according to claim 1.

14. The temperature sensor according to claim 13, wherein
the temperature sensor comprises:
the temperature sensing element;
a signal line that is electrically connected to the temperature sensing element on a tip-end side and is electrically connected to an external circuit on a rear-end side; and
a sheath pin accommodating the signal lines inside.

* * * * *